United States Patent
Fujiwara

(10) Patent No.: US 11,501,412 B2
(45) Date of Patent: Nov. 15, 2022

(54) IMAGE PROCESSING APPARATUS, IMAGING APPARATUS, IMAGE PROCESSING METHOD, AND IMAGE PROCESSING PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 770 days.

(21) Appl. No.: 16/426,665

(22) Filed: May 30, 2019

(65) Prior Publication Data

US 2019/0279340 A1 Sep. 12, 2019

Related U.S. Application Data

(63) Continuation of application No. PCT/JP2017/036648, filed on Oct. 10, 2017.

(30) Foreign Application Priority Data

Dec. 14, 2016 (JP) .............................. JP2016-242264

(51) Int. Cl.
*G06T 5/00* (2006.01)
*G06T 7/90* (2017.01)
(Continued)

(52) U.S. Cl.
CPC ................ *G06T 5/001* (2013.01); *G06T 7/90* (2017.01); *H04N 1/46* (2013.01); *H04N 1/60* (2013.01);
(Continued)

(58) Field of Classification Search
CPC . G06T 5/001; G06T 7/90; G06T 2207/10024; H04N 1/46; H04N 1/60;
(Continued)

(56) References Cited

U.S. PATENT DOCUMENTS

| 5,296,920 A | 3/1994 | Sakaue et al. |
| 2010/0231759 A1 | 9/2010 | Tsutsumi et al. |

(Continued)

FOREIGN PATENT DOCUMENTS

| JP | 5-76036 A | 3/1993 |
| JP | 2010-219797 A | 9/2010 |
| JP | 2016-58941 A | 4/2016 |

OTHER PUBLICATIONS

International Preliminary Report on Patentability and Written Opinion of the International Searching Authority (forms PCT/IB/373, PCT/ISA/237 and PCT/IB/326), dated Jun. 27, 2019, for corresponding International Application No. PCT/JP2017/036648, with a Written Opinion translation.

(Continued)

*Primary Examiner* — Twyler L Haskins
*Assistant Examiner* — Fayez A Bhuiyan
(74) *Attorney, Agent, or Firm* — Birch, Stewart, Kolasch & Birch, LLP

(57) ABSTRACT

An image processing apparatus, an imaging apparatus, an image processing method, and a non-transitory computer readable medium for storing an image processing program capable of controlling the brightness of a desired color in a captured image are provided. A brightness and color difference conversion processing unit generates a reference first brightness signal "Y1" and color difference signals "Cb and Cr" from color signals "$R_1$, $G_1$, and $B_1$" of three primary colors after gamma conversion. A second brightness signal generation unit generates a second brightness signal "Y2" in which a value of a brightness signal corresponding to a target color is decreased with respect to the first brightness signal "Y1" from the color signals "$R_1$, $G_1$, and $B_1$". The brightness of the desired target color can be controlled (Continued)

according to the reference first brightness signal "Y1" and the second brightness signal "Y2".

20 Claims, 23 Drawing Sheets

(51) Int. Cl.
    *H04N 1/60* (2006.01)
    *H04N 5/232* (2006.01)
    *H04N 1/46* (2006.01)
    *H04N 9/73* (2006.01)
    *H04N 9/04* (2006.01)
    *H04N 1/62* (2006.01)

(52) U.S. Cl.
    CPC .............. *H04N 1/624* (2013.01); *H04N 5/232* (2013.01); *H04N 9/04* (2013.01); *H04N 9/73* (2013.01); *G06T 2207/10024* (2013.01)

(58) Field of Classification Search
    CPC .......... H04N 1/624; H04N 5/232; H04N 9/04; H04N 9/73
    See application file for complete search history.

(56) References Cited

U.S. PATENT DOCUMENTS

2015/0016722 A1* 1/2015 Onda ................... H04N 9/3179
    382/167
2016/0078638 A1 3/2016 Endo et al.

OTHER PUBLICATIONS

International Search Report (form PCT/ISA/210), dated Dec. 26, 2017, for corresponding International Application No. PCT/JP2017/036648, with an English translation.

* cited by examiner

IMAGE PROCESSING APPARATUS, IMAGING APPARATUS, IMAGE PROCESSING METHOD, AND IMAGE PROCESSING PROGRAM

CROSS-REFERENCE TO RELATED APPLICATIONS

This application is a Continuation of PCT International Application No. PCT/JP2017/036648 filed on Oct. 10, 2017, which claims priority under 35 U.S.C § 119(a) to Japanese Patent Application No. 2016-242264 filed on Dec. 14, 2016. Each of the above application(s) is hereby expressly incorporated by reference, in its entirety, into the present application.

BACKGROUND OF THE INVENTION

1. Field of the Invention

The present invention relates to an image processing apparatus, an imaging apparatus, an image processing method, and a non-transitory computer readable medium for storing an image processing program and particularly, to a technology for controlling the brightness of a desired color in a captured image.

2. Description of the Related Art

In recent years, a high-sensitivity low noise image sensor has been developed by an improvement in performance of the image sensor.

In order to implement high sensitivity, a method of increasing the sensitivity of an R element among RGB elements respectively having spectral sensitivity to wavelength ranges of red (R), green (G), and blue (B) of the image sensor is generally used.

However, in a case where the sensitivity of the R element is increased, the brightness and the saturation of a red-based subject are increased, and it is likely that bright high saturation is caused. For example, in a case where a red flower is imaged, a problem arises in that color deviates to a bright side and a high saturation side, contrast is decreased, and solidity and texture deteriorate.

In order to resolve the problem, a method of performing a linear matrix process of multiplying RGB signal values output from the RGB elements of the image sensor by a 3×3 coefficient matrix is used.

As illustrated in [Expression 1] and [Expression 2] below, the method is a method of adjusting the brightness, the saturation, and the hue of an output R signal (OutR) by mixing an input R signal (InR) with an input G signal (InG) and an input B signal (InB) in creation of the output R signal (OutR).

$$OutR = (CoefR \times InR) + (CoefG \times InG) + (CoefB \times InB) \quad \text{[Expression 1]}$$

$$CoefR + CoefG + CoefB = 1 \quad \text{[Expression 2]}$$

(CoefR, CoefG, and CoefB are coefficients)

In addition, JP2016-058941A discloses an image processing apparatus that decreases noise while reducing a decrease in color reproducibility of an image by generating a first brightness signal and a color difference signal from RGB signals subjected to color correction, generating a second brightness signal from RGB signals not subjected to color correction, and generating and outputting a brightness signal by combining the first brightness signal and the second brightness signal at a predetermined ratio.

That is, since the first brightness signal is generated from the RGB signals subjected to color correction, the first brightness signal has characteristics such that its color reproducibility is high, but noise is increased by color correction. Meanwhile, since the second brightness signal is generated from the RGB signals before color correction, the second brightness signal has characteristics such that its color reproducibility is decreased, but an increase in noise is reduced. The invention disclosed in JP2016-058941A decreases noise while reducing a decrease in color reproducibility of the image by generating the brightness signal by combining the first brightness signal and the second brightness signal having the characteristics at a predetermined ratio.

SUMMARY OF THE INVENTION

In the method (linear matrix process) of multiplying the RGB signal values by the 3×3 coefficient matrix, brightness, saturation and hue change in connection with each other as described below. Thus, it is difficult to establish all of brightness, saturation, and hue.

In case of CoefG >0: The saturation of the red-based subject is decreased, but the brightness is increased.

In case of CoefG <0: The brightness of the red-based subject is decreased, but the saturation is increased.

In case of CoefB >0: The brightness of the red-based subject is decreased, but the hue is changed to a magenta tint.

In case of CoefB <0: The brightness of the red-based subject is increased, and the hue is changed to an orange tint.

The invention disclosed in JP2016-058941A is a technology for generating the brightness signal capable of decreasing noise while reducing a decrease in color reproducibility of the image and is not related to a technology for controlling the brightness of a desired color in a captured image.

The present invention is conceived in view of such a matter, and an object of the present invention is to provide an image processing apparatus, an imaging apparatus, an image processing method, and a non-transitory computer readable medium for storing an image processing program capable of controlling the brightness of a desired color in a captured image and not affecting color.

In order to achieve the object, an image processing apparatus according to one aspect of the present invention comprises a color signal obtaining unit that obtains a first color signal, a second color signal, and a third color signal of three primary colors indicating a captured image, a first brightness signal generation unit that generates a first brightness signal using the obtained first color signal, second color signal, and third color signal, and first coefficients which correspond to each of the first color signal, the second color signal, and the third color signal and are for generating the reference first brightness signal, a second brightness signal generation unit that generates a second brightness signal using the obtained first color signal, second color signal, and third color signal, and second coefficients which correspond to each of the first color signal, the second color signal, and the third color signal and are obtained by decreasing a weight of a coefficient corresponding to a target color in the first coefficients, and a third brightness signal generation unit that generates a third brightness signal in which a brightness of the target color is controlled based on the generated first brightness signal and second brightness signal.

According to one aspect of the present invention, the reference first brightness signal and the second brightness signal in which the value of the brightness signal corresponding to the target color is decreased with respect to the first brightness signal are generated. The third brightness signal in which the brightness of the target color is controlled is generated based on the first brightness signal and the second brightness signal. By adjusting the mixing ratio of the first brightness signal and the second brightness signal, the brightness of the desired target color can be controlled, and it is possible not to affect color (saturation and hue). The difference between the first brightness signal and the second brightness signal is increased as the saturation of the target color is increased. The brightness of the target color can be greatly changed by adjusting the mixing ratio.

It is preferable that the image processing apparatus according to another aspect of the present invention further comprises a mixing ratio obtaining unit that obtains a mixing ratio corresponding to a magnitude of the generated first brightness signal or second brightness signal, and the third brightness signal generation unit generates the third brightness signal by calculating a weighted mean of the first brightness signal and the second brightness signal based on the mixing ratio obtained by the mixing ratio obtaining unit.

In the image processing apparatus according to still another aspect of the present invention, the mixing ratio obtaining unit may obtain the mixing ratio such that the ratio of the second brightness signal to the first brightness signal is decreased as the generated first brightness signal or second brightness signal is increased, and the ratio of the second brightness signal to the first brightness signal is increased as the generated first brightness signal or second brightness signal is decreased. In this case, a change of the third brightness signal is greater than a change of the first brightness signal or the second brightness signal. The brightness contrast of the target color can be improved.

In the image processing apparatus according to still another aspect of the present invention, the mixing ratio obtaining unit may obtain the mixing ratio such that the ratio of the second brightness signal to the first brightness signal is increased as the generated first brightness signal or second brightness signal is increased, and the ratio of the second brightness signal to the first brightness signal is decreased as the generated first brightness signal or second brightness signal is decreased. In this case, a change of the third brightness signal is smaller than a change of the first brightness signal or the second brightness signal. The brightness contrast of the target color can be decreased.

In the image processing apparatus according to still another aspect of the present invention, it is preferable that the mixing ratio obtaining unit obtains the mixing ratio corresponding to the magnitude of the first brightness signal or the second brightness signal using a table or a relational expression showing a relationship between the magnitude of the first brightness signal or the second brightness signal and the mixing ratio. The table or the relational expression may be set in advance or may be calculated for each captured image.

In the image processing apparatus according to still another aspect of the present invention, it is preferable that the mixing ratio obtaining unit obtains the mixing ratio corresponding to the magnitude of the first brightness signal or the second brightness signal using the table or the relational expression corresponding to the target color. Accordingly, the mixing ratio corresponding to the target color can be obtained, and brightness corresponding to the target color can be controlled.

It is preferable that the image processing apparatus according to still another aspect of the present invention further comprises a correction coefficient setting unit that sets a correction coefficient such that a weight of a hue of the target color is the highest, and the weight is decreased as the hue deviates from the target color, a hue calculation unit that calculates the hue from the first color signal, the second color signal, and the third color signal, and a correction coefficient obtaining unit that obtains the corresponding correction coefficient from the correction coefficient setting unit depending on the hue calculated by the hue calculation unit, and the third brightness signal generation unit generates the third brightness signal by calculating the weighted mean of the first brightness signal and the second brightness signal based on the mixing ratio obtained by the mixing ratio obtaining unit and the correction coefficient obtained by the correction coefficient obtaining unit. Accordingly, the hue of the target color can be more accurately set, and only the brightness corresponding to the hue of the target color can be controlled.

It is preferable that the image processing apparatus according to still another aspect of the present invention further comprises a target color setting unit that sets the target color, and a second coefficient obtaining unit that calculates the second coefficients in which the weight of the coefficient corresponding to the target color set by the target color setting unit is decreased, or reads the second coefficients corresponding to the set target color from a storage unit storing the second coefficients, and the second brightness signal generation unit generates the second brightness signal using the obtained first color signal, second color signal, and third color signal, and the second coefficients obtained by the second coefficient obtaining unit. Accordingly, the target color of which the brightness is controlled can be set, and the second brightness signal in which the value of the brightness signal corresponding to the target color (set target color) of which the brightness is controlled is decreased with respect to the first brightness signal can be generated.

In the image processing apparatus according to still another aspect of the present invention, it is preferable that the target color setting unit is capable of setting n numbers of the target colors at the same time in a case where n denotes an integer greater than or equal to 2, the second coefficient obtaining unit obtains n sets of the second coefficients respectively corresponding to the n numbers of target colors in a case where the n numbers of target colors are set at the same time by the target color setting unit, and the second brightness signal generation unit generates n numbers of brightness signals based on the obtained first color signal, second color signal, and third color signal, and the n sets of second coefficients and sets the lowest brightness signal among the n numbers of brightness signals as the second brightness signal.

A plurality (n numbers greater than or equal to 2) of target colors can be set at the same time by the target color setting unit. In a case where the plurality of target colors are set at the same time, the second brightness signal used for controlling the brightness of the plurality of target colors can be generated for each target color.

It is preferable that the image processing apparatus according to still another aspect of the present invention further comprises a mixing ratio obtaining unit that obtains a mixing ratio corresponding to a magnitude of the first brightness signal or the second brightness signal using a table or a relational expression which shows a relationship between the magnitude of the first brightness signal or the second brightness signal and the mixing ratio and corresponds to any of the n numbers of target colors to which the lowest brightness signal corresponds, from n numbers of the tables or the relational expressions respectively corresponding to the n numbers of target colors, and the third brightness signal generation unit generates the third brightness signal by calculating a weighted mean of the first brightness signal and the second brightness signal based on the mixing ratio obtained by the mixing ratio obtaining unit.

In a case where the second brightness signal used for controlling the plurality of target colors at the same time is generated for each target color, the third brightness signal in which brightness is controlled for each target color can be generated by obtaining the mixing ratio for each target color. Accordingly, the brightness of each of the plurality of target colors can be controlled.

In the image processing apparatus according to still another aspect of the present invention, it is preferable that in a case where the second brightness signal is higher than the first brightness signal, the third brightness signal generation unit outputs the first brightness signal. Accordingly, it is possible not to control the brightness of a color other than the target color.

In the image processing apparatus according to still another aspect of the present invention, it is preferable that the total of the second coefficients respectively corresponding to the first color signal, the second color signal, and the third color signal is 1. Accordingly, the brightness of the target color can be controlled without changing the brightness of a monochrome color.

In the image processing apparatus according to still another aspect of the present invention, it is preferable that the first color signal, the second color signal, and the third color signal of three primary colors indicating the captured image are color signals after gamma conversion.

An imaging apparatus according to still another aspect of the present invention comprises an imaging unit that includes an imaging optical system and an imaging element, and the image processing apparatus. The color signal obtaining unit obtains the first color signal, the second color signal, and the third color signal of three primary colors indicating the captured image captured by the imaging unit.

An image processing method according to still another aspect of the present invention comprises a step of obtaining a first color signal, a second color signal, and a third color signal of three primary colors indicating a captured image, a step of generating a first brightness signal using the obtained first color signal, second color signal, and third color signal, and a first coefficients which correspond to each of the first color signal, the second color signal, and the third color signal and are for generating the reference first brightness signal, a step of generating a second brightness signal using the obtained first color signal, second color signal, and third color signal, and second coefficients which correspond to each of the first color signal, the second color signal, and the third color signal and are obtained by decreasing a weight of a coefficient corresponding to a target color in the first coefficients, and a step of generating a third brightness signal in which a brightness of the target color is controlled based on the generated first brightness signal and second brightness signal.

A non-transitory computer readable medium for storing an image processing program according to still another aspect of the present invention causes a computer to execute a function of obtaining a first color signal, a second color signal, and a third color signal of three primary colors indicating a captured image, a function of generating a first brightness signal using the obtained first color signal, second color signal, and third color signal, and a first coefficients which correspond to each of the first color signal, the second color signal, and the third color signal and are for generating the reference first brightness signal, a function of generating a second brightness signal using the obtained first color signal, second color signal, and third color signal, and second coefficients which correspond to each of the first color signal, the second color signal, and the third color signal and are obtained by decreasing a weight of a coefficient corresponding to a target color in the first coefficients, and a function of generating a third brightness signal in which a brightness of the target color is controlled based on the generated first brightness signal and second brightness signal.

According to the present invention, the brightness of a desired color in a captured image can be controlled, and it is possible not to affect color.

DESCRIPTION OF THE PREFERRED EMBODIMENTS

Hereinafter, exemplary embodiments of an image processing apparatus, an imaging apparatus, an image processing method, and an image processing program according to an embodiment of the present invention will be described in accordance with the appended drawings.

[Imaging Apparatus]

Figure 1:
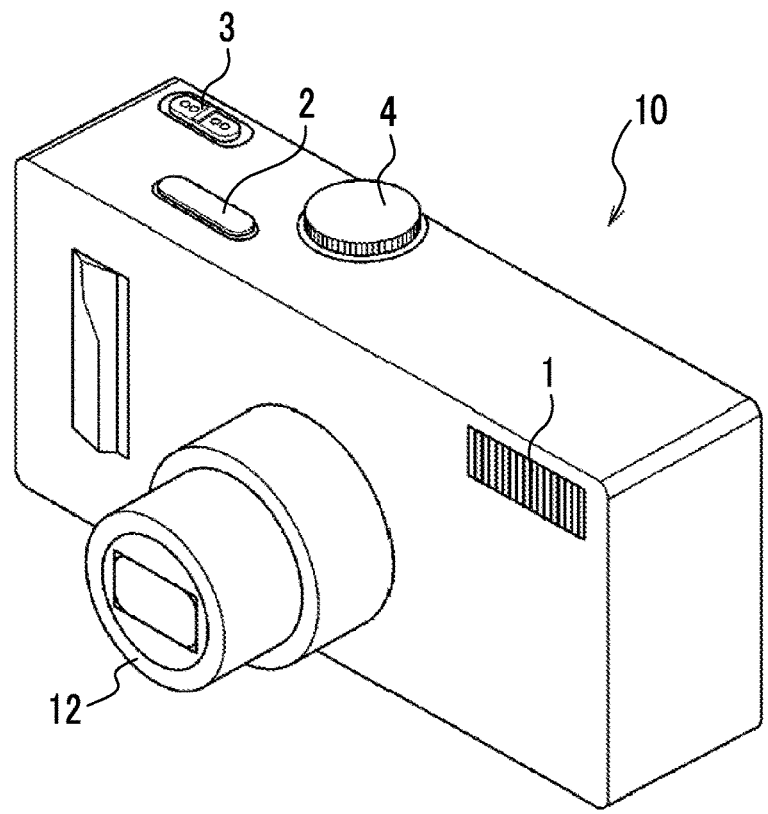
FIG. 1 is a perspective view illustrating an embodiment of an imaging apparatus according to the present invention.
Figure 2:
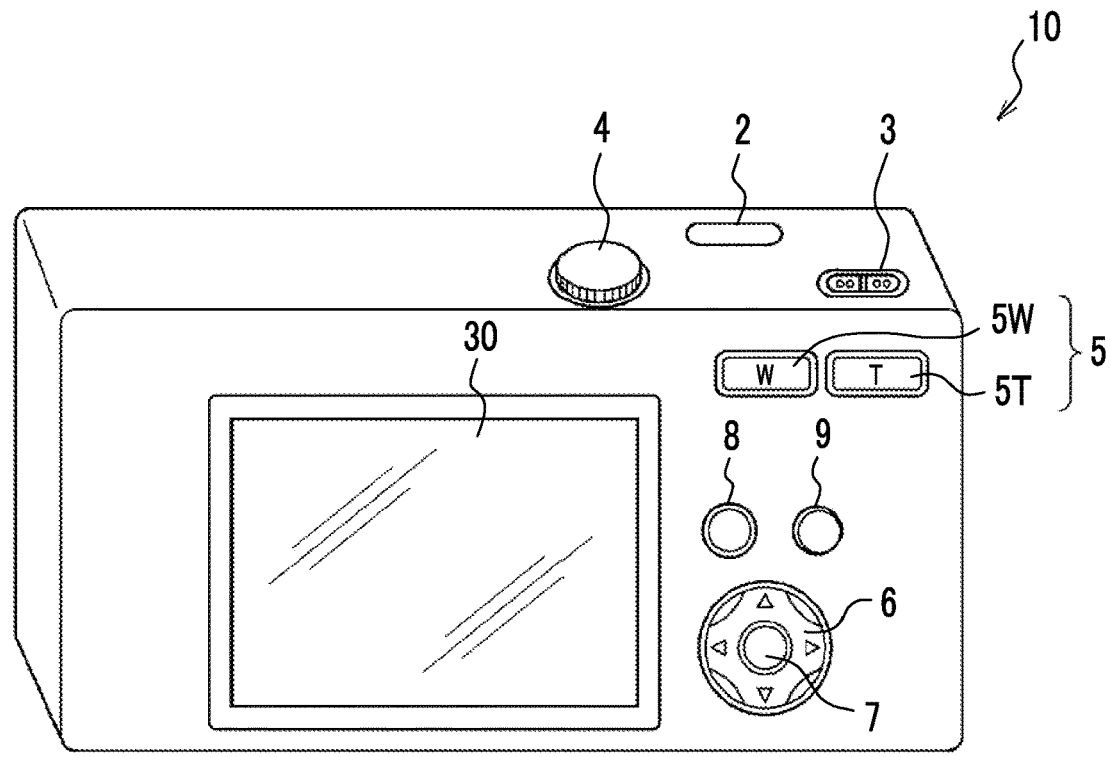
FIG. 2 is a rear view of the imaging apparatus illustrated in FIG. 1.

FIG. 1 and FIG. 2 are a perspective view and a rear view illustrating an embodiment of the imaging apparatus according to the embodiment of the present invention. An imaging apparatus 10 is a digital camera or a digital video camera that receives light passing through a lens by an imaging element, converts the light into a digital signal, and records the digital signal as image data of a still picture or a motion picture on a memory card.

As illustrated in FIG. 1, in the imaging apparatus 10, an imaging lens (imaging optical system) 12, a strobe 1, and the like are arranged on its front surface, and a shutter button 2, a power supply/mode switch 3, a mode dial 4, and the like are arranged on its upper surface. As illustrated in FIG. 2, a liquid crystal monitor 30, a zoom button 5, a cross button 6, a MENU/OK button 7, a playback button 8, a BACK button 9, and the like are arranged on the camera rear surface.

The imaging lens 12 is composed of a retractable zoom lens and is withdrawn from the camera main body by setting the mode of the camera to an imaging mode by the power supply/mode switch 3. The strobe 1 radiates strobe light toward a main subject.

The shutter button 2 is configured with a so-called 2-stage stroke switch including "half push (S1 ON)" and "full push (S2 ON)". The shutter button 2 functions as an imaging preparation instruction unit and functions as an image recording instruction unit.

In a case where a still picture imaging mode is selected as the imaging mode, and the shutter button 2 is "half pushed", the imaging apparatus 10 performs an imaging preparation operation of controlling AF/AE. In a case where the shutter button 2 is "fully pushed", the imaging apparatus 10 images and records a still picture.

In addition, in a case where a video imaging mode is selected as the imaging mode, and the shutter button 2 is "fully pushed", the imaging apparatus 10 starts recording a motion picture. In a case where the shutter button 2 is "fully pushed" again, the imaging apparatus 10 stops recording and is set to be in a standby state.

The power supply/mode switch 3 has a function as a power supply switch for setting a power supply of the imaging apparatus 10 to be ON/OFF and a function as a mode switch for setting the mode of the imaging apparatus 10. The power supply/mode switch 3 is arranged to be slidable among an "OFF position", a "playback position", and an "imaging position". In the imaging apparatus 10, sliding the power supply/mode switch 3 to the "playback position" or the "imaging position" sets the power supply to be ON, and sliding the power supply/mode switch 3 to the "OFF position" sets the power supply to be OFF. Sliding the power supply/mode switch 3 to the "playback position" sets a "playback mode", and sliding the power supply/mode switch 3 to the "imaging position" sets the "imaging mode".

The mode dial 4 functions as imaging mode setting means for setting the imaging mode of the imaging apparatus 10. The imaging mode of the imaging apparatus 10 is set to various modes depending on the setting position of the mode dial 4. For example, the "still picture imaging mode" for performing still picture imaging and the "video imaging mode" for performing motion picture imaging are present.

The liquid crystal monitor 30 displays a live view image at the time of the imaging mode, displays a still picture or a motion picture at the time of the playback mode, and functions as a part of a graphical user interface by displaying a menu screen and the like.

The zoom button 5 functions as zoom instruction means for providing an instruction to zoom and includes a tele button 5T providing an instruction to zoom to a telephoto side and a wide button 5W providing an instruction to zoom to a wide angle side. In the imaging apparatus 10, the focal length of the imaging lens 12 is changed by operating the tele button 5T and the wide button 5W at the time of the imaging mode. In addition, the image during its playback is enlarged or shrunk by operating the tele button 5T and the wide button 5W at the time of the playback mode.

The cross button 6 is a multifunction button for inputting instructions in four directions of upward, downward, leftward, and rightward directions. The cross button 6 functions as a button (cursor movement operation means) for selecting an item from the menu screen or providing an instruction to select various setting items from each menu. A left/right key functions as a frame advance (forward direction/backward direction advance) button at the time of the playback mode.

The MENU/OK button 7 is an operation button having functions of both a menu button for providing an instruction to display the menu on the screen of the liquid crystal monitor 30 and an OK button for providing an instruction to confirm and execute the content of selection and the like.

The cross button 6, the MENU/OK button 7, and the liquid crystal monitor 30 function as a target color setting unit setting a target color of which the brightness is controlled as will be described below.

The playback button 8 is a button for switching to the playback mode for displaying the imaged and recorded still picture or the motion picture on the liquid crystal monitor 30.

The BACK button 9 functions as a button providing an instruction to cancel an input operation or return to the immediately previous operation state.

[Internal Configuration of Imaging Apparatus]

Figure 3:
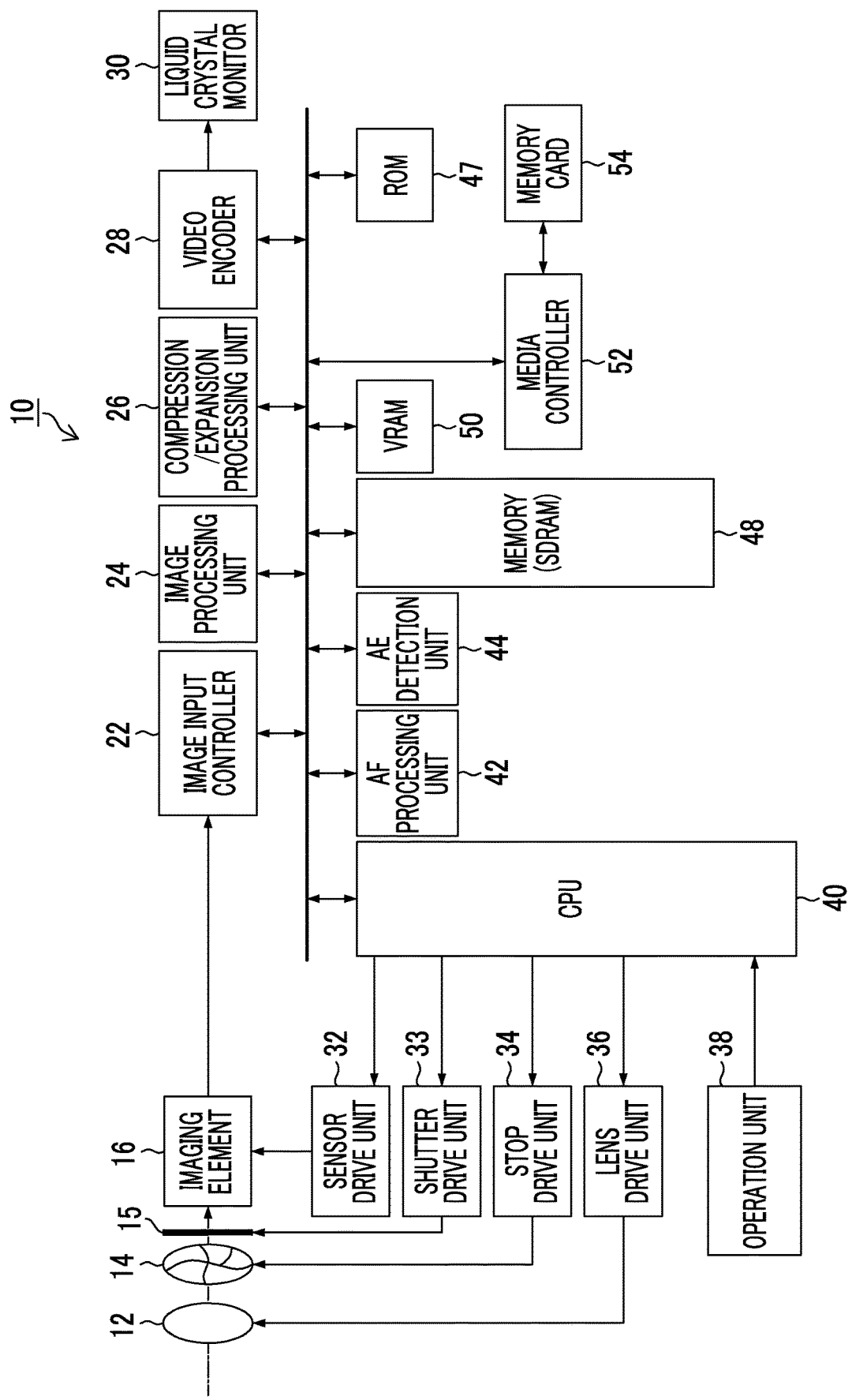
FIG. 3 is a block diagram illustrating an embodiment of an internal configuration of the imaging apparatus illustrated in FIG. 1.

FIG. 3 is a block diagram illustrating an embodiment of an internal configuration of the imaging apparatus 10.

As illustrated in FIG. 3, the imaging apparatus 10 records the captured image on the memory card 54, and the operation of the whole apparatus is managed and controlled by a central processing unit (CPU) 40.

An operation unit 38 such as the shutter button 2, the power supply/mode switch 3, the mode dial 4, the tele button 5T, the wide button 5W, the cross button 6, the MENU/OK button 7, the playback button 8, and the BACK button 9 is disposed in the imaging apparatus 10. A signal from the operation unit 38 is input into the CPU 40, and the CPU 40 controls each circuit of the imaging apparatus 10 based on the input signal. For example, the CPU 40 performs drive control of an imaging element (image sensor) 16 by a sensor drive unit 32, drive control of a mechanical shutter 15 by a shutter drive unit 33, drive control of a stop 14 by a stop drive unit 34, and drive control of the imaging lens 12 by a lens drive unit 36, and also performs imaging operation control, image processing control, recording/playback control of the image data, and display control of the liquid crystal monitor 30.

In a case where the power supply of the imaging apparatus 10 is set to be ON by the power supply/mode switch 3, power is supplied to each block from a power supply unit, not illustrated, and driving of the imaging apparatus 10 is started.

A luminous flux passing through the imaging lens 12, the stop 14, the mechanical shutter 15, and the like is imaged in the imaging element 16 that is a complementary metal-oxide semiconductor (CMOS) type color image sensor. The imaging element 16 is not limited to a CMOS type and may be an XY address type or charge coupled device (CCD) type color image sensor.

The imaging element 16 is configured with a plurality of elements in which color filters of red (R), green (G), or blue (B) are arranged in matrix form in a predetermined pattern arrangement (Bayer arrangement, G stripe R/G full checker, X-Trans (registered trademark) arrangement, honeycomb arrangement, or the like). Each element is configured to include a microlens, a color filter of any of R, G, or B, and a photodiode. The element including the color filter of R, G, or B is referred to as an R pixel, a G pixel, or a B pixel, respectively.

In a case where the operation mode of the imaging apparatus 10 is set to the still picture imaging mode, the imaging apparatus 10 starts capturing the image and displays the live view image on the liquid crystal monitor 30. At the time of displaying the live view image, the CPU 40 executes AF and AE based on the calculation results of an autofocus (AF) processing unit 42 and an auto exposure (AE) detection unit 44.

The AF processing unit 42 is a part performing a contrast AF process or a phase difference AF process. In the case of performing the contrast AF process, high-frequency components of consecutively captured images in an AF area are extracted, and an AF evaluation value indicating a focused state is calculated by integrating the high-frequency components. The CPU 40 performs AF control (contrast AF) by moving a focus lens in the imaging lens 12 to a lens position having the maximum AF evaluation value based on the AF evaluation value calculated by the AF processing unit 42.

In addition, in a case where the imaging element 16 includes a phase difference pixel, for example, the AF processing unit 42 calculates phase difference data (for example, an integrating accumulation value of the absolute value of a difference between each output data of a pair of phase difference pixels) based on each output data of a pair of a plurality of phase difference pixels in the AF area, and calculates a deviation amount (defocus amount) in optical axis direction between a focus position of the imaging lens 12 and an imaging surface of the imaging element 16 based on the calculated phase difference data. The CPU 40 performs the AF control (phase difference AF) by moving the focus lens in the imaging lens 12 to a lens position having the defocus amount equal to zero based on the defocus amount calculated by the AF processing unit 42.

The AE detection unit 44 performs integrating accumulation of the signal of the G pixel (G signal) on the whole screen or integrating accumulation of the G signal differently weighted between a screen center portion and a peripheral portion and outputs the integrating accumulation value to the CPU 40. The CPU 40 calculates the brightness (imaging Ev value) of the subject using the integrating accumulation value input from the AE detection unit 44, decides the F-number of the stop 14 and the electronic shutter (shutter speed) of the imaging element 16 in accordance with a predetermined program chart based on the imaging Ev value, and obtains an appropriate exposure amount by controlling the F-number of the stop 14 and the electronic shutter function of the imaging element 16 in accordance with the decided F-number and the shutter speed.

In a case where the shutter button 2 is "fully pushed", the CPU 40 starts imaging the still picture or the motion picture to be recorded on the memory card 54.

In addition, the ROM 47 is a read only memory (ROM) or an electrically erasable programmable read-only memory (EEPROM) in which a camera control program, defect information related to the imaging element 16, and various parameters and tables used in image processing and the like are stored. In the present example, the ROM 47 stores a coefficient (second coefficients) or the like used for calculating the brightness of the target color from the RGB signals corresponding to the RGB pixels. Details of the second coefficients will be described below.

The RGB signals (mosaic image signals) output from the imaging element 16 at the time of imaging the still picture or the motion picture are input and temporarily stored in a memory (synchronous dynamic random access memory (SDRAM)) 48 from an image input controller 22.

The RGB signals (RAW data) temporarily stored in the memory 48 are appropriately read by the image processing unit 24, and signal processing such as an offset correction process, a white balance correction process, a demosaicing process, gamma-correction processing, and a brightness and color difference conversion process is performed. Details of the image processing unit 24 will be described below.

Image data processed by the image processing unit 24 is input into a video RAM (VRAM) 50. The VRAM 50 includes an A region and a B region. Image data representing an image of one frame is recorded in each of the A region and the B region. In the VRAM 50, the image data representing the image of one frame is alternately rewritten between the A region and the B region. Written image data is read from a region other than a region of the A region and the B region of the VRAM 50 in which the image data is rewritten.

The image data read from the VRAM 50 is encoded in a video encoder 28 and is output to the liquid crystal monitor 30 disposed on the camera rear surface. Accordingly, the live view image is continuously displayed on the display screen of the liquid crystal monitor 30.

The compression/expansion processing unit 26 performs compression processing on a brightness signal (Y) and color difference signals (Cb) and (Cr) that are processed by the image processing unit 24 and are temporarily stored in the memory 48 at the time of recording the still picture or the motion picture. In the case of the still picture, for example, the compression is performed in the joint photographic coding experts group (JPEG) format. In the case of the motion picture, for example, the compression is performed in the H.264 format. The compression image data compressed by the compression/expansion processing unit 26 is recorded on the memory card 54 through a media controller 52.

In addition, the compression/expansion processing unit 26 performs expansion processing on the compression image data obtained from the memory card 54 through the media controller 52 at the time of the playback mode. The media controller 52 performs recording, reading, and the like of the compression image data in the memory card 54.

<Image Processing>

Figure 4:
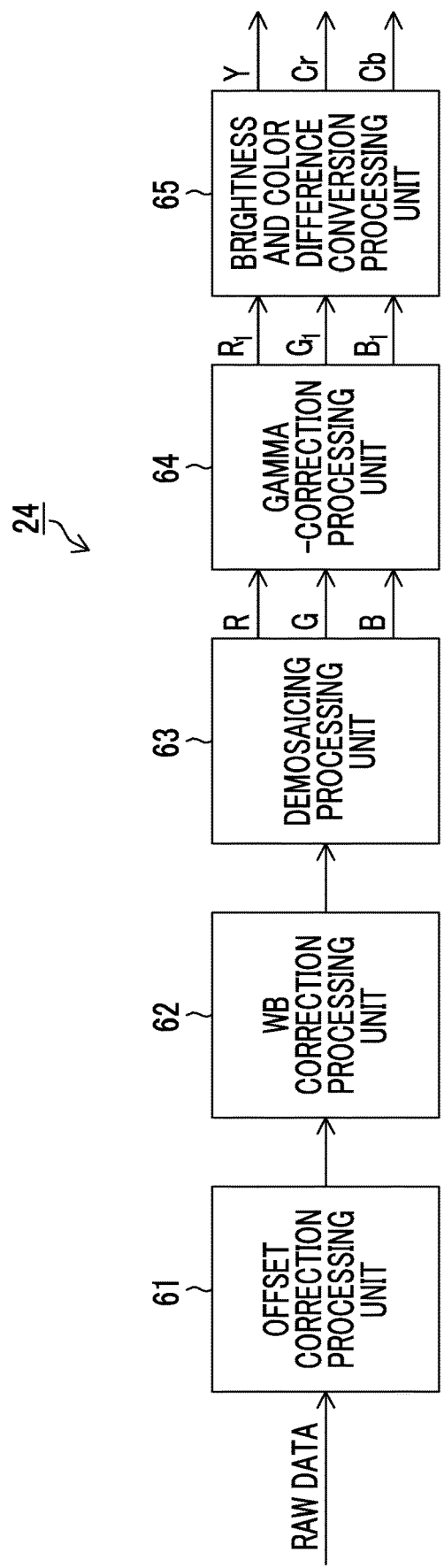
FIG. 4 is a main block diagram illustrating an embodiment of an image processing unit of the imaging apparatus illustrated in FIG. 3.

FIG. 4 is a main block diagram illustrating an embodiment of the image processing unit 24 of the imaging apparatus 10 illustrated in FIG. 3.

As illustrated in FIG. 4, the image processing unit 24 mainly includes an offset correction processing unit 61, a white balance (WB) correction processing unit 62, a demosaicing processing unit 63, a gamma-correction processing unit 64, and a brightness and color difference conversion processing unit 65.

In FIG. 4, the offset correction processing unit 61 dot-sequentially inputs the RAW data before image processing (RGB signals (color signals of RGB) in a mosaic form of RGB) obtained from the imaging element 16. For example, the RAW data is data (data of 2 bytes per 1 pixel) having a bit length of 12 bits (0 to 4095) for each of RGB.

The offset correction processing unit 61 is a processing unit that corrects a dark current component included in the input color signals of RGB and performs offset correction on the color signals of RGB by subtracting a signal value of an optical black area (OB) obtained from a light-shielded pixel on the imaging element 16 from the color signals of RGB.

The color signals of RGB subjected to the offset correction is provided to the WB correction processing unit 62. The WB correction processing unit 62 performs white balance correction on the color signals of RGB by multiplying each of the color signals of RGB by a WB gain set for each color of RGB. For example, the WB gain is such that a light source type is automatically determined based on the color signals of RGB, or a light source type is manually selected, and the WB gain appropriate for the determined or selected light source type is set. However, the method of setting the WB gain is not for limitation purposes. The WB gain can be set using other well-known methods.

The demosaicing processing unit 63 is a part that performs a demosaicing process (referred to as demosaicing) of calculating all color information for each pixel from a mosaic image corresponding to the color filter arrangement of the single plate type imaging element 16. For example, in the case of an imaging element including color filters of three colors of RGB, color information for all of RGB is calculated for each pixel from a mosaic image of RGB. That is, the demosaicing processing unit 63 generates color signals "R, G, and B" in three planes of RGB demosaiced from the dot-sequential color signals of RGB (mosaic data).

The color signals "R, G, and B" of RGB subjected to the demosaicing process are provided to the gamma-correction processing unit 64.

The gamma-correction processing unit 64 performs gamma-correction processing on the input color signals "R, G, and B" based on a logarithmic process and performs a non-linear gradation correction process on the color signals "R, G, and B" such that the image is naturally reproduced by a display apparatus.

Figure 5:
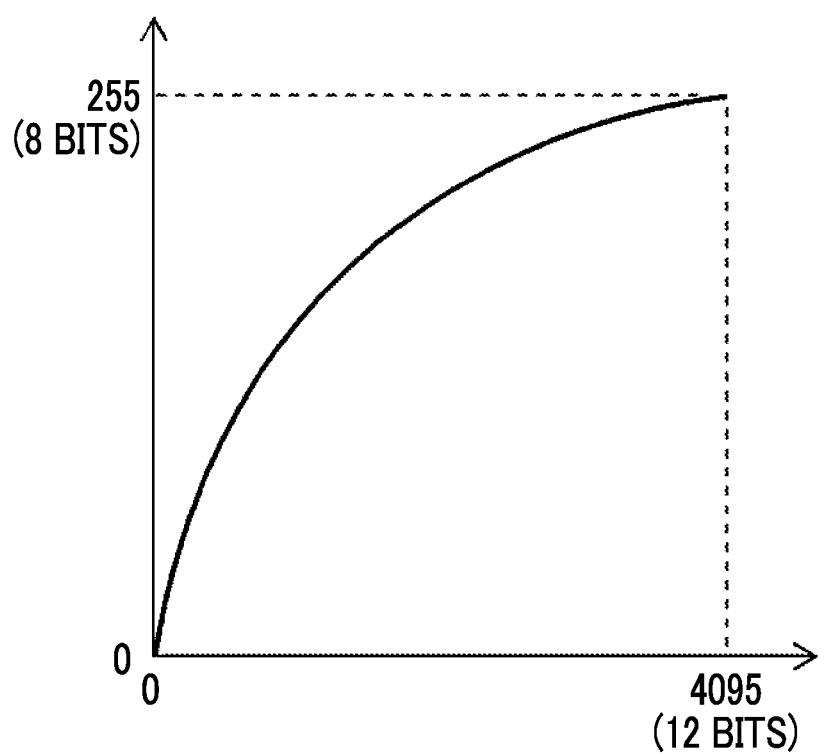
FIG. 5 is a graph illustrating one example of input-output characteristics (gamma characteristics) subjected to gamma correction by a gamma-correction processing unit.

FIG. 5 is a graph illustrating one example of input-output characteristics (gamma characteristics) subjected to the gamma correction by the gamma-correction processing unit 64. In the present example, the gamma-correction processing unit 64 generates the color signals "R, G, and B" of 8 bits (0 to 255) by performing the gamma correction corresponding to the gamma characteristics on the color signals "R, G, and B" of 12 bits (0 to 4095). For example, it is preferable that the gamma-correction processing unit 64 can be configured with a look-up table for each of RGB and performs the gamma correction corresponding to each color of RGB. The gamma-correction processing unit 64 includes non-linear gradation correction performed on input data based on a tone curve.

A first color signal, a second color signal, and a third color signal (color signals "$R_1$, $G_1$, and $B_1$") of three primary colors that are subjected to the gamma correction (gamma conversion) by the gamma-correction processing unit 64 and indicate the captured image are provided to the brightness and color difference conversion processing unit 65. The color signals "$R_1$, $G_1$, and $B_1$" are converted into a first brightness signal "Y1" and the color difference signals "Cr and Cb". The gamma-correction processing unit 64 or the brightness and color difference conversion processing unit 65 functions as a color signal obtaining unit obtaining color signals of three primary colors according to the embodiment of the present invention.

<Brightness and Color Difference Conversion Process>

Hereinafter, a first embodiment to a fifth embodiment of the brightness and color difference conversion processing unit 65 corresponding to the image processing apparatus according to the embodiment of the present invention will be described.

First Embodiment

Figure 6:
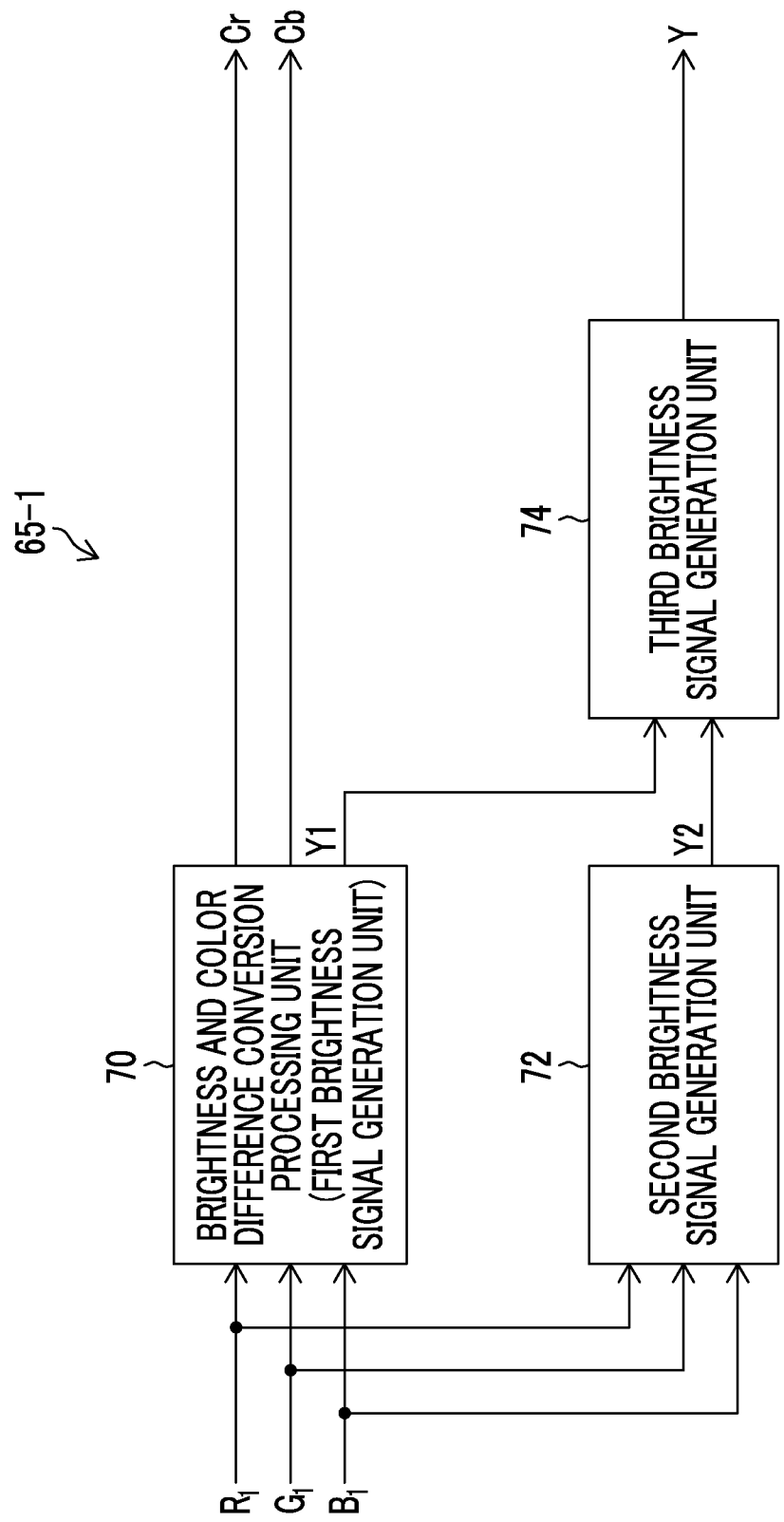
FIG. 6 is a block diagram illustrating a brightness and color difference conversion processing unit of a first embodiment.

FIG. 6 is a block diagram illustrating a brightness and color difference conversion processing unit 65-1 of the first embodiment.

The brightness and color difference conversion processing unit 65-1 illustrated in FIG. 6 is mainly configured with a brightness and color difference conversion processing unit 70 including a first brightness signal generation unit, a second brightness signal generation unit 72, and a third brightness signal generation unit 74.

Each of the color signals "$R_1$, $G_1$, and $B_1$" of three primary colors after the gamma conversion is output to the brightness and color difference conversion processing unit 70 and the second brightness signal generation unit 72.

The brightness and color difference conversion processing unit 70 generates the reference first brightness signal "Y1" and the color difference signals "Cr and Cb" based on the input color signals "$R_1$, $G_1$, and $B_1$" after the gamma conversion.

The first brightness signal "Y1" refers to a brightness signal generated by weighted addition of the color signals "$R_1$, $G_1$, and $B_1$" of three primary colors using reference coefficients (first coefficients). In a case where the first coefficients for the color signals "$R_1$, $G_1$, and $B_1$" are denoted by Kr1, Kg1, and Kb1, the first brightness signal "Y1" is calculated by the following expression.

$$Y1 = (Kr1 \times R_1) + (Kg1 \times G_1) + (Kb1 \times B_1) \quad \text{[Expression 3]}$$

In BT.601 that is a standard for reference television broadcasting, the following coefficients are used as the first coefficients "Kr1, Kg1, and Kb1" for the color signals "$R_1$, $G_1$, and $B_1$" after the gamma conversion.

$$Kr1 = 0.299 \quad \text{[Expression 4]}$$

$$Kg1 = 0.587 \quad \text{[Expression 5]}$$

$$Kb1 = 0.114 \quad \text{[Expression 6]}$$

$$Kr1 + Kg1 + Kb1 = 1.000 \quad \text{[Expression 7]}$$

In addition, in BT.601, the color difference signals "Cr and Cb" are calculated by the following expressions.

$$Cr = 0.713 \times (R_1 - Y1) = 0.500 \times R_1 - 0.419 \times G_1 - 0.081 \times B_1 \quad \text{[Expression 8]}$$

$$Cb = 0.713 \times (B_1 - Y1) = -0.169 \times R_1 - 0.331 \times G_1 + 0.500 \times B_1 \quad \text{[Expression 9]}$$

In BTA S-001B that is a standard for high-definition television (HDTV), coefficients different from the first coefficients shown in [Expression 4] to [Expression 6] are used as the first coefficients "Kr1, Kg1, and Kb1".

The first brightness signal generation unit of the brightness and color difference conversion processing unit 70 calculates the first brightness signal "Y1" from [Expression 3] based on the color signals "$R_1$, $G_1$, and $B_1$" after the gamma conversion and the first coefficients "Kr1, Kg1, and Kb1" and outputs the calculated first brightness signal "Y1" to the third brightness signal generation unit 74.

In addition, the brightness and color difference conversion processing unit 70 calculates the color difference signals "Cr and Cb" from the color signals "$R_1$, $G_1$, and $B_1$" after the gamma conversion based on [Expression 7] and [Expression 8].

The second brightness signal generation unit 72 is a part that generates a second brightness signal "Y2" from the color signals "$R_1$, $G_1$, and $B_1$" after the gamma conversion and calculates the second brightness signal (Y2) using the following expression and second coefficients "Kr2, Kg2, and Kb2" different from the first coefficients "Kr1, Kg1, and Kb1".

$$Y2 = (Kr2 \times R_1) + (Kg2 \times G_1) + (Kb2 \times B_1) \quad \text{[Expression 10]}$$

Coefficients (second coefficients) obtained by decreasing the weight of a coefficient corresponding to a desired color (target color) of which the brightness in the captured image is to be controlled among the first coefficients "Kr1, Kg1, and Kb1" respectively corresponding to the color signals "$R_1$, $G_1$, and $B_1$" are used as the second coefficients "Kr2, Kg2, and Kb2".

In addition, for the second coefficients "Kr2, Kg2, and Kb2", it is preferable that the total of the second coefficients "Kr2, Kg2, and Kb2" is set to be equal to one by increasing the weight of a coefficient other than the coefficient of which the weight is decreased.

For example, in the case of controlling the brightness of a red-based target color, the weight of the coefficient "Kr2" corresponding to the color signal "$R_1$" of red among the second coefficients "Kr2, Kg2, and Kb2" is decreased below the coefficient "Kr1" among the first coefficients "Kr1, Kg1, and Kb1", and the weight of one or both of the coefficients "Kg2 and Kb2" corresponding to the color signals "$G_1$ and $B_1$" of other colors is increased above the coefficients "Kg1 and Kb1". Examples of the numerical values of the second coefficients "Kr2, Kg2, and Kb2" in a case where the target color is red-based are shown in [Expression 11] to [Expression 13].

$$Kr2 = Kr1/2 = 0.150 \text{ (weight is decreased below } Kr1) \quad \text{[Expression 11]}$$

$$Kg2 = Kg1 \times (1 - Kr2)/(Kg1 + Kb1) = 0.712 \text{ (weight is increased above } Kg1) \quad \text{[Expression 12]}$$

$$Kb2 = Kb1 \times (1 - Kr2)/(Kg1 + Kb1) = 0.138 \text{ (weight is increased above } Kb1) \quad \text{[Expression 13]}$$

$$Kr2 + Kg2 + Kb2 = 1.000 \quad \text{[Expression 14]}$$

In a case where the first brightness signal "Y1" is calculated using the first coefficients "Kr1, Kg1, and Kb1" shown in [Expression 4] to [Expression 6], and the second brightness signal "Y2" is calculated using the second coefficients "Kr2, Kg2, and Kb2" shown in [Expression 11] to [Expression 13], the first brightness signal "Y1" and the second brightness signal "Y2" have the following relationship.

(1) Y1>Y2 is established for a red-based subject, and Y1<Y2 is established for a non-red-based subject.

(2) The difference between Y1 and Y2 is large for high saturation red (a subject in which "$R_1$" is dominant among "$R_1$, $G_1$, and $B_1$"), and the difference between Y1 and Y2 is small for low saturation red. For a monochrome color, Y1=Y2 is established.

While the examples of the numerical values shown in [Expression 11] to [Expression 13] are the second coefficients "Kr2, Kg2, and Kb2" in a case where the target color is red-based, the second coefficients "Kr2, Kg2, and Kb2" corresponding to the target color are used in a case where the target color is non-red-based.

For example, the second coefficients "Kr2, Kg2, and Kb2" corresponding to a green-based target color are such that the weight of the coefficient "Kg2" corresponding to the color signal ($G_1$) of green among the second coefficients "Kr2, Kg2, and Kb2" is decreased below the coefficient "Kg1" among the first coefficients "Kr1, Kg1, and Kb1".

The second coefficients "Kr2, Kg2, and Kb2" corresponding to a blue-based target color are such that the weight of the coefficient "Kb2" corresponding to the color signal ($B_1$) of blue among the second coefficients "Kr2, Kg2, and Kb2" is decreased below the coefficient "Kb1" among the first coefficients "Kr1, Kg1, and Kb1".

In addition, the second coefficients "Kr2, Kg2, and Kb2" corresponding to a yellow-based target color are such that the weights of the coefficients "Kr2 and Kg2" corresponding to the color signals ($R_1$ and $G_1$) of red and green among the second coefficients "Kr2, Kg2, and Kb2" are decreased below the coefficients "Kr1 and Kg1" among the first coefficients "Kr1, Kg1, and Kb1".

The second coefficients "Kr2, Kg2, and Kb2" corresponding to a cyan-based target color are such that the weights of the coefficients "Kg2 and Kb2" corresponding to the color signals ($G_1$ and $B_1$) of green and blue among the second coefficients "Kr2, Kg2, and Kb2" are decreased below the coefficients "Kg1 and Kb1" among the first coefficients "Kr1, Kg1, and Kb1".

The second coefficients "Kr2, Kg2, and Kb2" corresponding to a magenta-based target color are such that the weights of the coefficients "Kr2 and Kb2" corresponding to the color signals ($R_1$ and $B_1$) of red and blue among the second coefficients "Kr2, Kg2, and Kb2" are decreased below the coefficients "Kr1 and Kb1" among the first coefficients "Kr1, Kg1, and Kb1".

The second brightness signal generation unit 72 calculates the second brightness signal "Y2" based on [Expression 10] using the color signals "$R_1$, $G_1$, and $B_1$" of three primary colors after the gamma conversion and the second coefficients "Kr2, Kg2, and Kb2" corresponding to the target color as described above, and outputs the calculated second brightness signal "Y2" to the third brightness signal generation unit 74.

The third brightness signal generation unit 74 generates a third brightness signal "Y" in which the brightness of the target color is controlled based on the first brightness signal "Y1" input from the brightness and color difference conversion processing unit 70 (first brightness signal generation unit) and the second brightness signal "Y2" input from the second brightness signal generation unit 72.

The first brightness signal "Y1" and the second brightness signal "Y2" have the following relationship.

(1) The second brightness signal "Y2" corresponding to the target color is decreased below the first brightness signal "Y1".

(2) The difference between the first brightness signal "Y1" and the second brightness signal "Y2" is large in a case where the brightness signal corresponds to a high saturation target color, and is small in a case where the brightness signal corresponds to a low saturation target color.

Accordingly, based on the first brightness signal "Y1" and the second brightness signal "Y2", the third brightness signal generation unit 74 can determine the first brightness signal "Y1" and the second brightness signal "Y2" corresponding to a "high saturation target color" and can generate, for example, the third brightness signal "Y" in which the brightness of the "high saturation target color" is controlled. In addition, by controlling the brightness of the "high saturation target color", the third brightness signal "Y" in which the brightness contrast is improved or reduced for only the "high saturation target color" can be generated.

The brightness and color difference conversion processing unit 65-1 of the first embodiment outputs the third brightness signal "Y" generated by the third brightness signal generation unit 74 and the color difference signals "Cr and Cb" generated by the brightness and color difference conversion processing unit 70 to signal processing units in the subsequent stage. For example, the third brightness signal "Y" is output to a contour highlighting circuit performing a contour highlighting process, and the color difference signals "Cr and Cb" are output to a color difference matrix circuit performing tone correction.

[First Embodiment of Image Processing Method]

Figure 7:
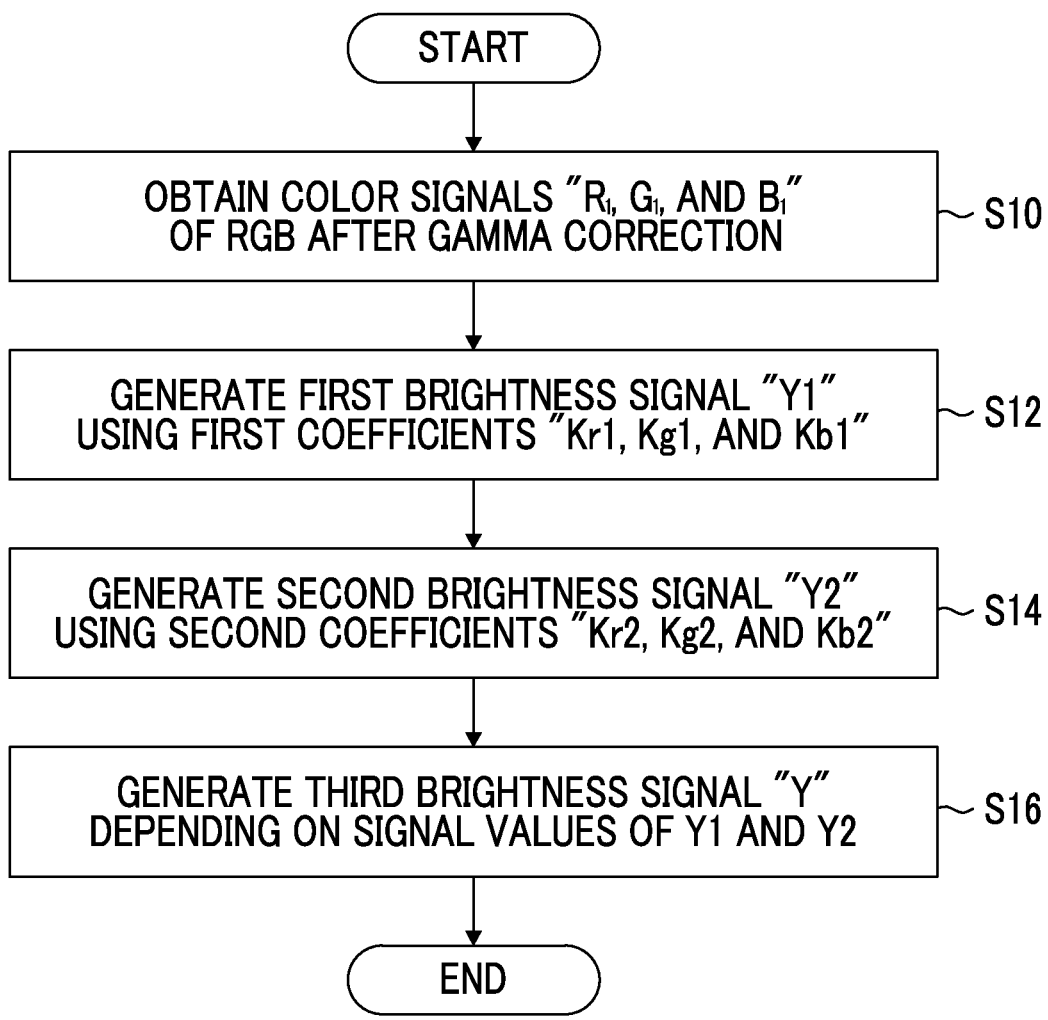
FIG. 7 is a flowchart illustrating a first embodiment of an image processing method performed by the brightness and color difference conversion processing unit illustrated in FIG. 6.

FIG. 7 is a flowchart illustrating a first embodiment of the image processing method performed by the brightness and color difference conversion processing unit 65-1.

In FIG. 7, the brightness and color difference conversion processing unit 65-1 illustrated in FIG. 6 obtains the color signals "$R_1$, $G_1$, and $B_1$" of three primary colors of RGB after the gamma conversion from the gamma-correction processing unit 64 (FIG. 4) (step S10).

The first brightness signal generation unit included in the brightness and color difference conversion processing unit 70 generates the first brightness signal "Y1" from the color signals "$R_1$, $G_1$, and $B_1$" obtained in step S10 using the reference first coefficients "Kr1, Kg1, and Kb1" (for example, the coefficients shown in [Expression 4] to [Expression 6]) (step S12).

In addition, the second brightness signal generation unit 72 generates the second brightness signal "Y2" from the color signals "$R_1$, $G_1$, and $B_1$" obtained in step S10 using the second coefficients "Kr2, Kg2, and Kb2" (for example, in the case of the red-based target color, the coefficients shown in [Expression 11] to [Expression 13]) set in correspondence with the target color of which the brightness is controlled (step S14).

The third brightness signal generation unit 74 generates the third brightness signal "Y" in which the brightness of the target color is controlled depending on the signal values of the first brightness signal "Y1" and the second brightness signal "Y2" respectively generated in steps S12 and S14 (step S16).

Accordingly, the third brightness signal in which the brightness of the target color is controlled can be generated. For example, by adjusting the mixing ratio of the first brightness signal and the second brightness signal, the brightness of the subject having a specific hue and high saturation can be controlled. In addition, since the color difference signals "Cr and Cb" do not change, it is possible not to affect the color (the saturation and the hue).

Second Embodiment

Figure 8:
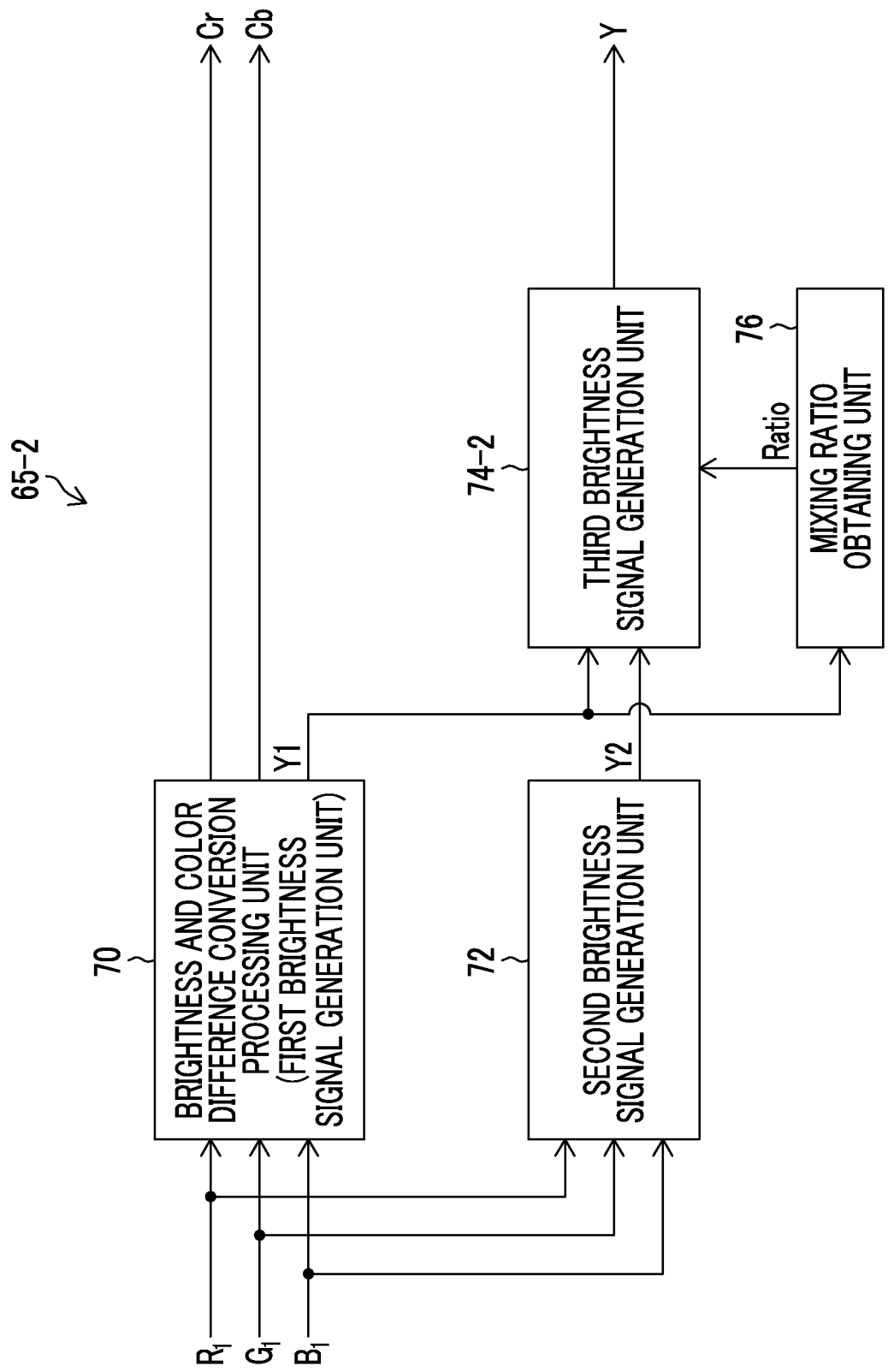
FIG. 8 is a block diagram illustrating a brightness and color difference conversion processing unit of a second embodiment.

FIG. 8 is a block diagram illustrating a brightness and color difference conversion processing unit 65-2 of the second embodiment. In FIG. 8, common parts in the brightness and color difference conversion processing unit 65-1 of the first embodiment illustrated in FIG. 6 will be designated by the same reference signs, and detailed description of such parts will not be repeated.

The difference between the brightness and color difference conversion processing unit 65-2 of the second embodiment illustrated in FIG. 8 and the brightness and color difference conversion processing unit 65-1 of the first embodiment is addition of a mixing ratio obtaining unit 76 and a specific third brightness signal generated by a third brightness signal generation unit 74-2.

In FIG. 8, the reference first brightness signal "Y1" generated by the first brightness signal generation unit included in the brightness and color difference conversion processing unit 70 is provided to the third brightness signal generation unit 74-2 and the mixing ratio obtaining unit 76.

The mixing ratio obtaining unit 76 obtains a mixing ratio "Ratio" corresponding to the magnitude of the input first brightness signal "Y1" and outputs the obtained mixing ratio "Ratio" to the third brightness signal generation unit 74-2.

Figure 9:
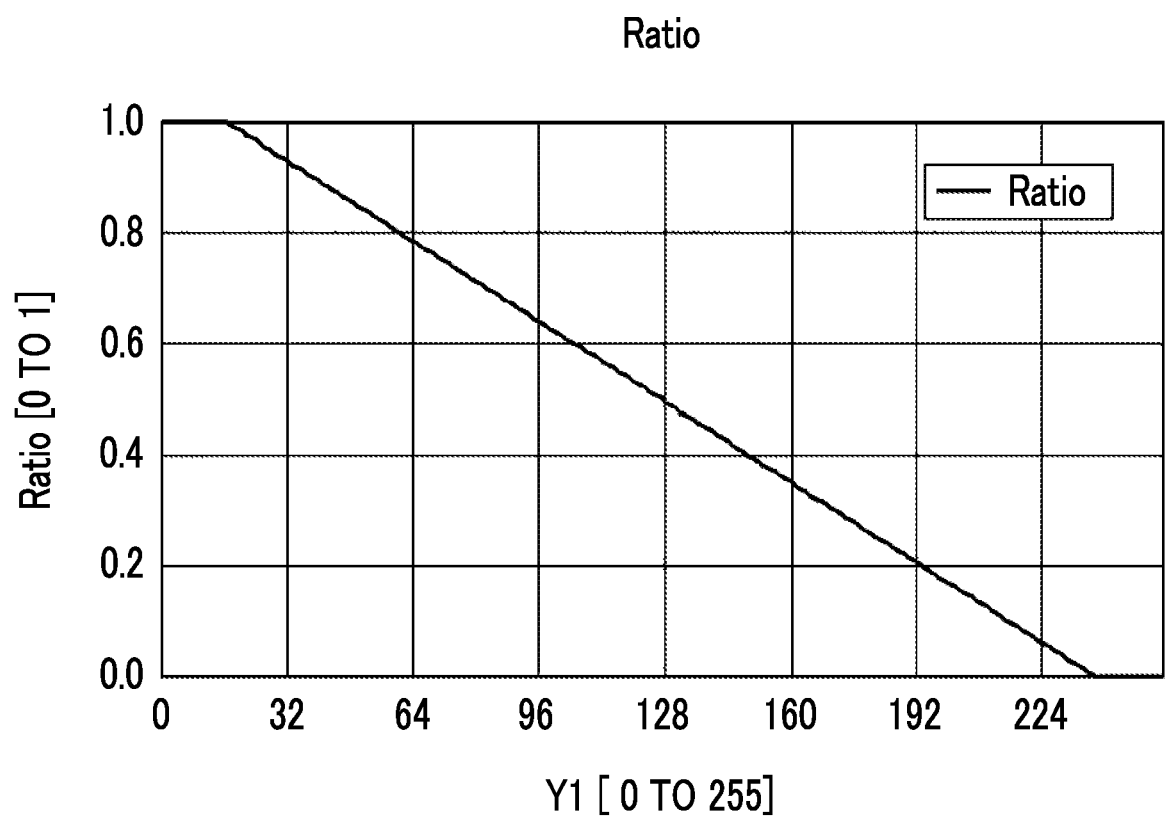
FIG. 9 is a graph illustrating one example of a relationship between the magnitude of a first brightness signal "Y1" and a mixing ratio "Ratio".

FIG. 9 is a graph illustrating one example of a relationship between the magnitude of the first brightness signal "Y1" and the mixing ratio "Ratio".

Since the first brightness signal "Y1" is a signal of 8 bits, the magnitude of the first brightness signal "Y1" is a signal value in the range of "0 to 255". In addition, the mixing ratio "Ratio" has a domain of "0 to 1". In addition, in the present example, the mixing ratio "Ratio" for the first brightness signal "Y1" of "0" and a nearby signal value is "1". The mixing ratio "Ratio" is decreased in proportion to the magnitude of the first brightness signal "Y1". The mixing ratio "Ratio" for the first brightness signal "Y1" of "255" and a nearby signal value is "1".

The mixing ratio obtaining unit 76 reads the mixing ratio "Ratio" corresponding to the magnitude of the input first brightness signal "Y1" from a table by referring to the table (look-up table) in which the relationship between the first brightness signal "Y1" and the mixing ratio "Ratio" illustrated by the graph in FIG. 9 is stored, or calculates the mixing ratio "Ratio" corresponding to the magnitude of the input first brightness signal "Y1" using a relational expression showing the relationship between the first brightness signal "Y1" and the mixing ratio "Ratio" illustrated by the graph in FIG. 9. The mixing ratio obtaining unit 76 outputs the mixing ratio "Ratio read from the table or calculated from the relational expression to the third brightness signal generation unit 74-2.

The table or the relational expression showing the relationship between the first brightness signal "Y1" and the mixing ratio "Ratio" stored in advance in the ROM 47 of the imaging apparatus 10 can be used. In addition, the table or the relational expression may be generated by calculating the relationship between the first brightness signal "Y1" and the mixing ratio "Ratio" for each captured image. For example, a histogram of the brightness of the captured image is created. The range of the first brightness signal "Y1" in which the mixing ratio "Ratio" is set to "1", the range of the first brightness signal "Y1" in which the mixing ratio "Ratio" is set to "0", and a range in which the mixing ratio "Ratio" is linearly changed in the range of "1 to 0" are decided based on the created histogram. The table or the relational expression showing the relationship between the first brightness signal "Y1" and the mixing ratio "Ratio" is generated.

In addition, the mixing ratio obtaining unit 76 of the present example that obtains the mixing ratio "Ratio" corresponding to the magnitude of the first brightness signal "Y1" is not for limitation purposes. The second brightness signal "Y2" generated by the second brightness signal generation unit 72 may be input, and the mixing ratio "Ratio" corresponding to the magnitude of the second brightness signal "Y2" may be obtained.

The third brightness signal generation unit 74-2 generates the third brightness signal "Y" by calculating the weighted mean of the first brightness signal "Y1" input from the brightness and color difference conversion processing unit 70 and the second brightness signal "Y2" input from the second brightness signal generation unit 72 using the following expression based on the mixing ratio "Ratio" provided from the mixing ratio obtaining unit 76.

$$Y=Y1\times(1-\text{Ratio})+Y2\times\text{Ratio}$$ [Expression 15]

$$0\leq\text{Ratio}\leq1$$ [Expression 16]

Figure 10:
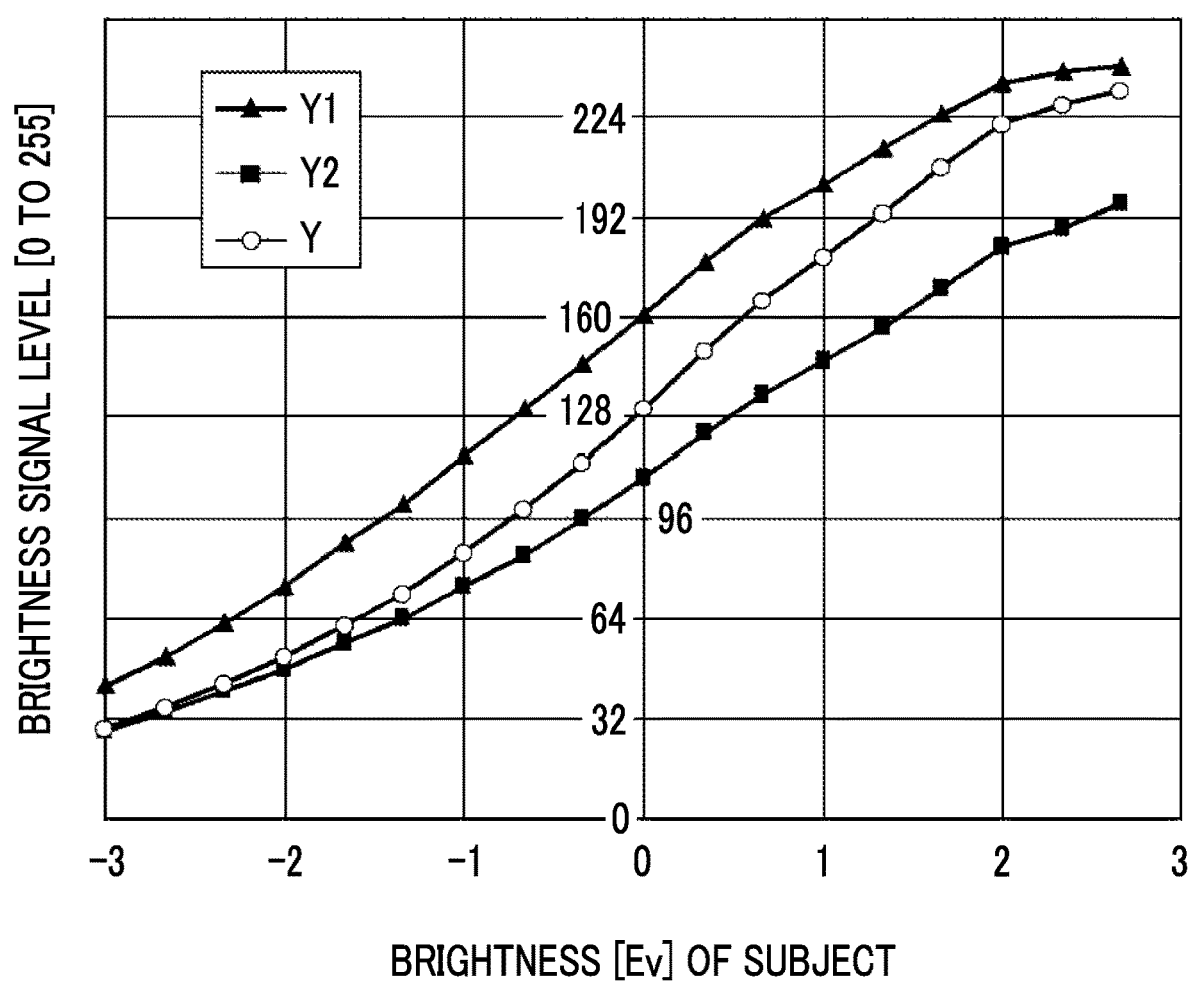
FIG. 10 is a graph illustrating the first brightness signal "Y1", a second brightness signal "Y2", and a third brightness signal "Y" generated by calculating the weighted mean of the first brightness signal "Y1" and the second brightness signal "Y2".

FIG. 10 is a graph illustrating the first brightness signal "Y1", the second brightness signal "Y2", and the third brightness signal "Y" generated by calculating the weighted mean of the first brightness signal "Y1" and the second brightness signal "Y2".

As illustrated in FIG. 10, the second brightness signal "Y2" corresponding to the target color is decreased below the first brightness signal "Y1". In addition, the difference between the first brightness signal "Y1" and the second brightness signal "Y2" is large in a case where the brightness signal corresponds to a high saturation target color, and is small in a case where the brightness signal corresponds to a low saturation target color.

In the third brightness signal "Y" generated by calculating the weighted mean of the first brightness signal "Y1" and the second brightness signal "Y2" based on [Expression 15] using the mixing ratio "Ratio" illustrated in FIG. 9, a change in brightness signal (difference in brightness) with respect to a change in brightness of the subject is increased, compared to that in the general first brightness signal "Y1" in the related art as illustrated in FIG. 10. That is, the third brightness signal "Y" has a higher inclination than the first brightness signal "Y1", and the brightness contrast is increased.

The case where the mixing ratio "Ratio" indicating the ratio of the second brightness signal "Y2" to the first brightness signal "Y1" is decreased as the first brightness signal "Y1" is increased and is increased as the first brightness signal "Y1" is decreased (example in FIG. 9) is not for limitation purposes. The mixing ratio "Ratio" may be increased as the first brightness signal "Y1" is increased and be decreased as the first brightness signal "Y1" is decreased. In the case of the latter mixing ratio "Ratio", the third brightness signal "Y" has a lower inclination than the first brightness signal "Y1", and the brightness contrast is decreased. In addition, the case where the mixing ratio "Ratio" linearly changes with respect to a change of the first brightness signal "Y1" is not for limitation purposes. The mixing ratio "Ratio" may change non-linearly.

In addition, while the mixing ratio obtaining unit 76 obtains the mixing ratio "Ratio" corresponding to the first brightness signal "Y1" based on the table or the relational expression showing the relationship between the first brightness signal "Y1" and the mixing ratio "Ratio", the mixing ratio obtaining unit 76 may obtain the mixing ratio "Ratio" corresponding to the first brightness signal "Y1" using a different table or a relational expression for each target color. In this case, the third brightness signal generation unit 74-2 can generate the third brightness signal "Y" for which the method of controlling the brightness is different depending on the target color.

[Second Embodiment of Image Processing Method]

Figure 11:
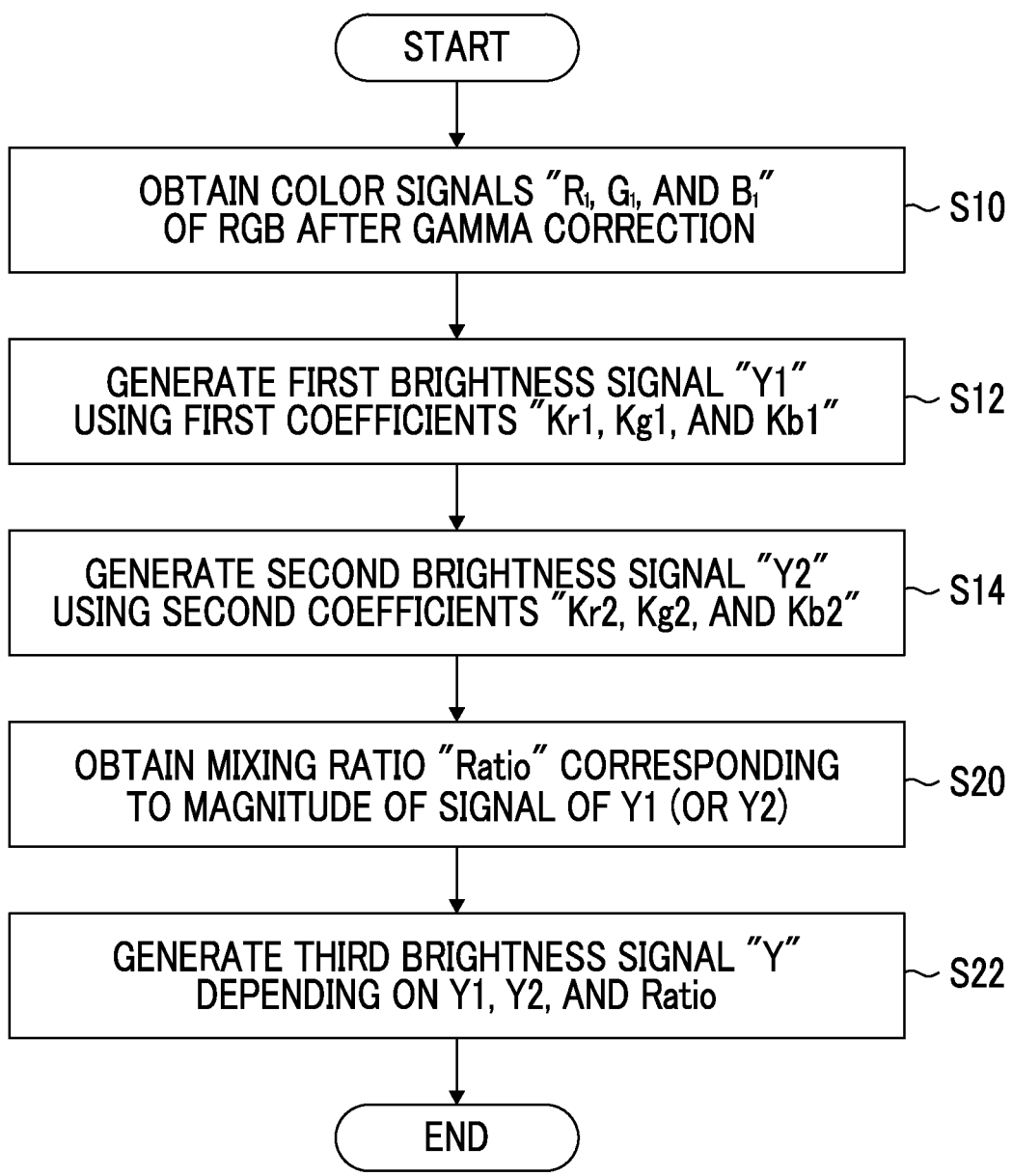
FIG. 11 is a flowchart illustrating a second embodiment of an image processing method performed by the brightness and color difference conversion processing unit illustrated in FIG. 8.

FIG. 11 is a flowchart illustrating a second embodiment of the image processing method performed by the brightness and color difference conversion processing unit 65-2. In FIG. 11, common steps in the first embodiment illustrated in FIG. 7 will be designated by the same step numbers, and detailed description of such steps will not be repeated.

In the image processing method of the second embodiment illustrated in FIG. 11, the process up to the generation of the first brightness signal "Y1" and the second brightness signal "Y2" is the same as that in the first embodiment.

The mixing ratio obtaining unit 76 obtains the mixing ratio "Ratio" corresponding to the magnitude of the first brightness signal "Y1" (or the second brightness signal "Y2") based on the first brightness signal "Y1" generated in step S12 (or the second brightness signal "Y2" generated in step S14) and the table or the relational expression showing the relationship between the first brightness signal "Y1" (or the second brightness signal "Y2") and the mixing ratio "Ratio" (step S20).

The third brightness signal generation unit 74-2 generates the third brightness signal "Y" by calculating the weighted mean of the first brightness signal "Y1" and the second brightness signal "Y2" respectively generated in steps S12 and S14 depending on the mixing ratio "Ratio" obtained in step S20 (step S22).

Accordingly, the third brightness signal in which the brightness of the target color is controlled can be generated. In addition, it is possible not to affect the color (the saturation and the hue).

Third Embodiment

Figure 12:
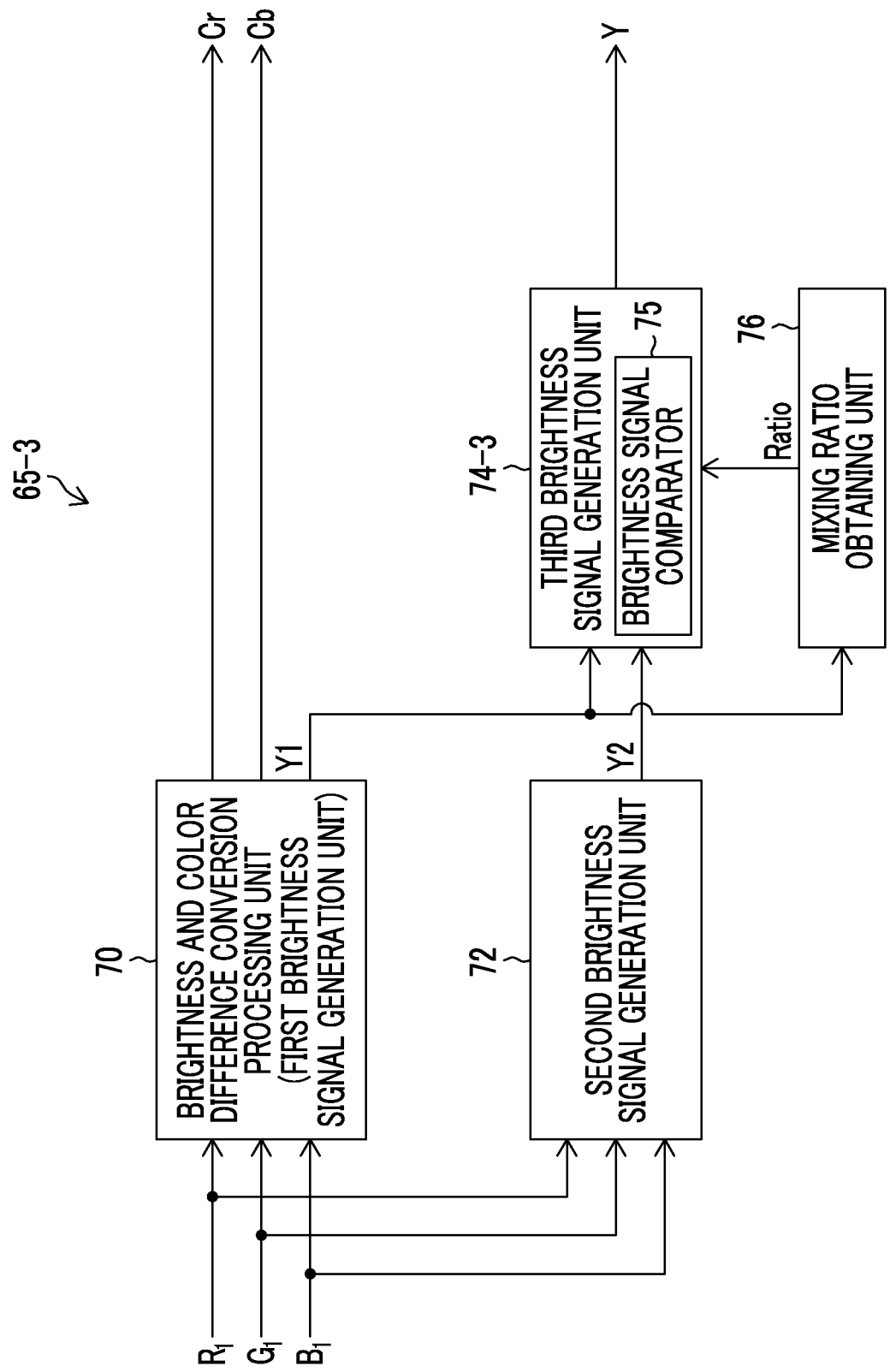
FIG. 12 is a block diagram illustrating a brightness and color difference conversion processing unit of a third embodiment.

FIG. 12 is a block diagram illustrating a brightness and color difference conversion processing unit 65-3 of the third embodiment. In FIG. 12, common parts in the brightness and color difference conversion processing unit 65-2 of the second embodiment illustrated in FIG. 8 will be designated by the same reference signs, and detailed description of such parts will not be repeated.

The difference between the brightness and color difference conversion processing unit 65-3 of the third embodiment illustrated in FIG. 12 and the brightness and color difference conversion processing unit 65-2 of the second embodiment is a third brightness signal generation unit 74-3.

The third brightness signal generation unit 74-3 illustrated in FIG. 12 further comprises a brightness signal comparator 75. The brightness signal comparator 75 compares the first brightness signal "Y1" input from the brightness and color difference conversion processing unit 70 with the second brightness signal "Y2" input from the second brightness signal generation unit 72. In a case where the second brightness signal "Y2" is higher than the first brightness signal "Y1", the brightness signal comparator 75 outputs the first brightness signal "Y1" as the third brightness signal "Y".

The reason is that the first brightness signal "Y1" and the second brightness signal "Y2" in a case where the second brightness signal "Y2" is increased above the first brightness signal "Y1" are not a brightness signal corresponding to the hue of the target color. In a case where the second brightness signal "Y2" is increased above the first brightness signal "Y1", the brightness signal corresponding to a hue of a color other than the target color is not caused to change (brightness is not controlled) by outputting the first brightness signal "Y1" as the third brightness signal "Y".

In a case where the brightness signal comparator 75 determines that the first brightness signal "Y1" is lower than or equal to the second brightness signal "Y2", the third brightness signal generation unit 74-3 generates the third brightness signal "Y" by calculating the weighted mean of the first brightness signal "Y1" and the second brightness signal "Y2" depending on the mixing ratio "Ratio" obtained by the mixing ratio obtaining unit 76 in the same manner as the second embodiment, and outputs the generated third brightness signal "Y".

Accordingly, only the brightness corresponding to the hue of the target color can be controlled.

[Third Embodiment of Image Processing Method]

Figure 13:
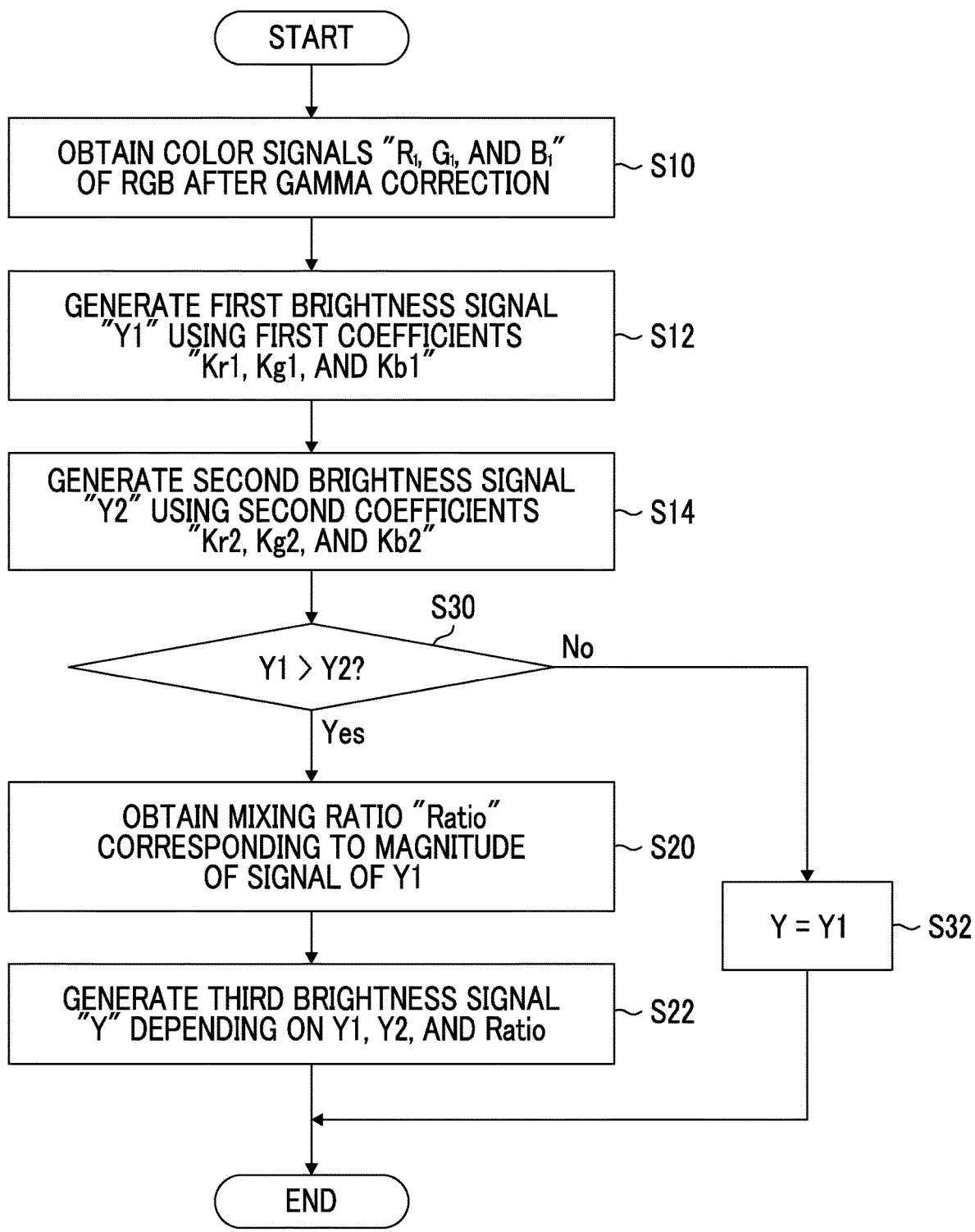
FIG. 13 is a flowchart illustrating a third embodiment of an image processing method performed by the brightness and color difference conversion processing unit illustrated in FIG. 12.

FIG. 13 is a flowchart illustrating a third embodiment of the image processing method performed by the brightness and color difference conversion processing unit 65-3. In FIG. 13, common steps in the second embodiment illustrated in FIG. 11 will be designated by the same step numbers, and detailed description of such steps will not be repeated.

The image processing method of the third embodiment illustrated in FIG. 13 is different from the second embodiment in that processes of step S30 and step S32 are added.

In step S30, the first brightness signal "Y1" generated in step S12 is compared with the second brightness signal "Y2" generated in step S14. A transition is made to step S20 in a case where the first brightness signal "Y1" is higher than the second brightness signal "Y2" (in the case of "Yes"). The brightness and color difference conversion processing unit 65-3 generates the third brightness signal "Y" in the same manner as the second embodiment (steps S20 and S22).

Meanwhile, in a case where the first brightness signal "Y1" is not higher than the second brightness signal "Y2" (in the case of "No"), a transition is made to step S32.

In step S32, the third brightness signal "Y" is not generated from the first brightness signal "Y1", the second brightness signal "Y2", and the mixing ratio "Ratio". The first brightness signal "Y1" is output as the third brightness signal "Y".

Accordingly, the third brightness signal in which the brightness of the hue of the color other than the target color is not controlled and only the brightness of the target color is controlled can be generated. In addition, it is possible not to affect the color (the saturation and the hue).

Fourth Embodiment

Figure 14:
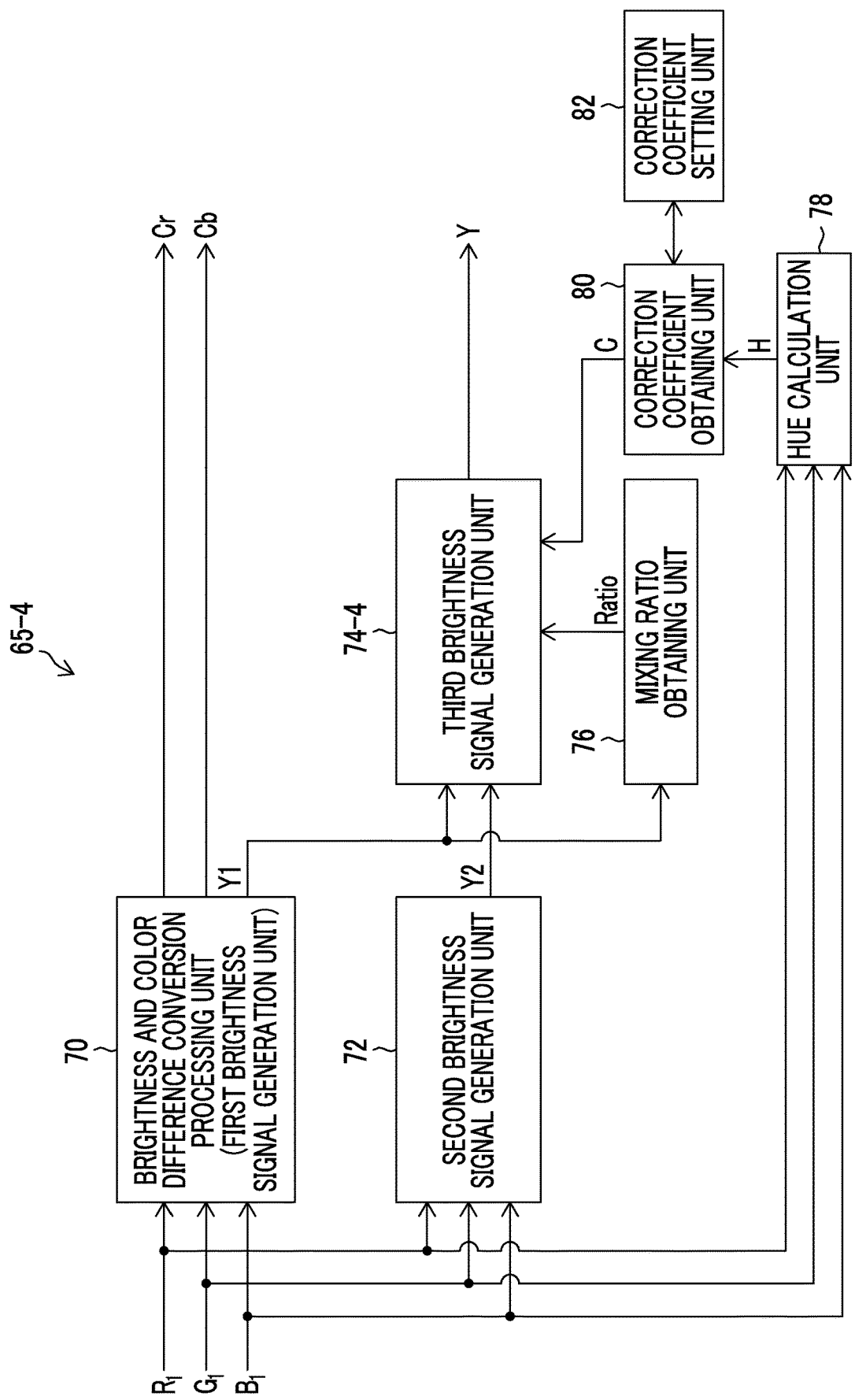
FIG. 14 is a block diagram illustrating a brightness and color difference conversion processing unit of a fourth embodiment.

FIG. 14 is a block diagram illustrating a brightness and color difference conversion processing unit 65-4 of the fourth embodiment. In FIG. 14, common parts in the brightness and color difference conversion processing unit 65-3 of the third embodiment illustrated in FIG. 12 will be designated by the same reference signs, and detailed description of such parts will not be repeated.

The difference between the brightness and color difference conversion processing unit 65-4 of the fourth embodiment illustrated in FIG. 14 and the brightness and color difference conversion processing unit 65-3 of the third embodiment is addition of a hue calculation unit 78, a correction coefficient obtaining unit 80, and a correction coefficient setting unit 82 and a method of generating the third brightness signal "Y" by a third brightness signal generation unit 74-4.

In FIG. 14, the color signals "$R_1$, $G_1$, and $B_1$" after the gamma conversion are provided to the hue calculation unit 78. The hue calculation unit 78 calculates a hue "H" for each pixel based on the input color signals "$R_1$, $G_1$, and $B_1$". The hue "H" is a hue in the HSV color space including three components of hue, saturation chroma, and value lightness brightness and can be calculated from the color signals "$R_1$, $G_1$, and $B_1$" in the RGB color space using a well-known conversion expression. In addition, the hue "H" can be obtained from a value of a*b* by converting the color signals "$R_1$, $G_1$, and $B_1$" after the gamma conversion into the L*a*b* color space. The hue "H" is represented as an angle that changes in the range of 0° to 360° in the HSV color space. For example, the hue "H" of red is 0°.

The hue "H" calculated by the hue calculation unit 78 is output to the correction coefficient obtaining unit 80.

The correction coefficient setting unit 82 is a part that sets a correction coefficient such that the weight of the hue of the target color is the highest, and the weight is decreased as the hue deviates from the target color.

Figure 15:
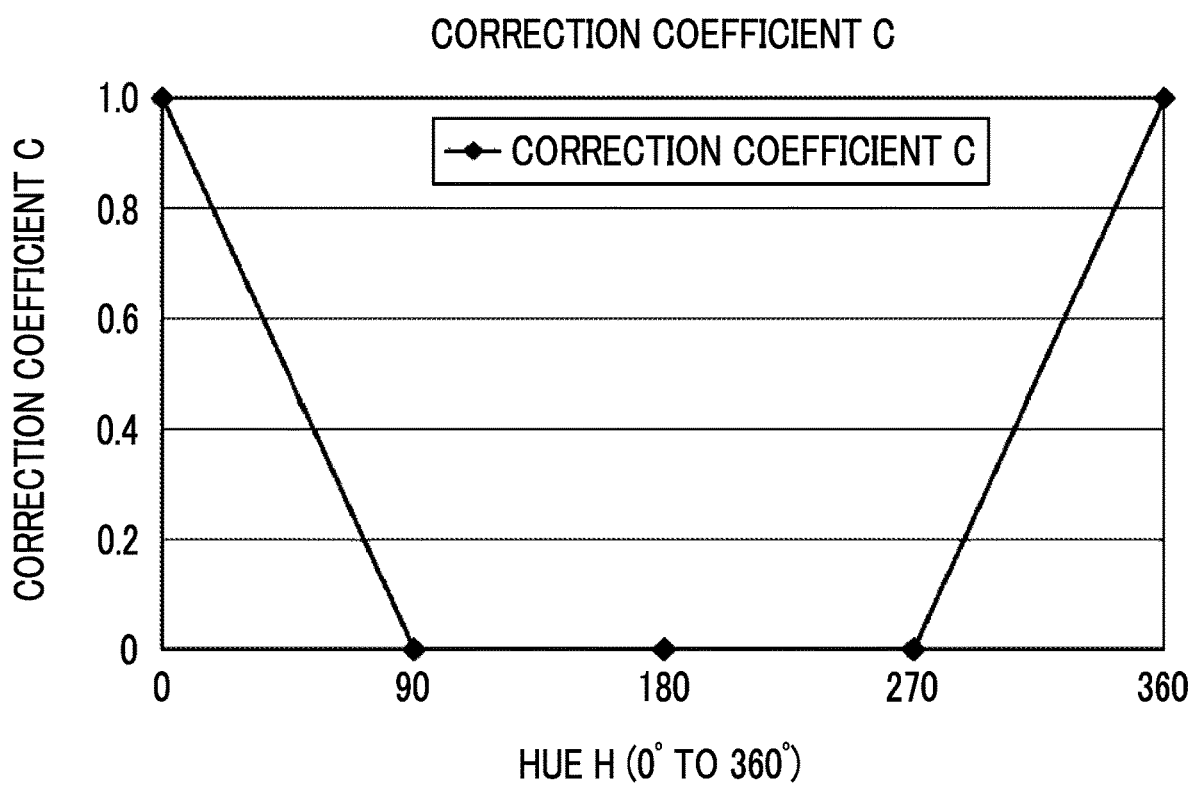
FIG. 15 is a graph illustrating a relationship between a hue "H" (H: 0° to 360°) and a correction coefficient "C" (C: 0 to 1.0) set in a case where the hue "H" of a target color is red.

FIG. 15 is a graph illustrating a relationship between the hue "H" (H: 0° to 360°) and a correction coefficient "C" (C: 0 to 1.0) set in a case where the hue "H" of the target color is red. The correction coefficient setting unit 82 includes a table or a relational expression corresponding to the graph in FIG. 15 for each target color. In a case where the target color is set, the correction coefficient setting unit 82 sets the correction coefficient (the table or the relational expression showing the correction coefficient) corresponding to the target color.

The correction coefficient obtaining unit 80 obtains the corresponding correction coefficient "C" from the correction coefficient setting unit 82 depending on the hue "H" calculated by the hue calculation unit 78. For example, as illustrated in FIG. 15, in a case where the target color is set to red, "1.0" is obtained as the correction coefficient "C" when the hue "H" calculated by the hue calculation unit 78 is 0° (red). When the hue "H" is in the range of 90° to 270°, "0" is obtained as the correction coefficient "C". When the hue "H" is in the range of 0° to 90° and 270° to 360°, a correction coefficient in the range of "0 to 1.0" corresponding to the hue "H" is obtained as the correction coefficient "C".

That is, in a case where the hue "H" input from the hue calculation unit 78 is the hue matching the target color, the correction coefficient obtaining unit 80 obtains the highest correction coefficient "1.0" as the correction coefficient "C" and obtains a smaller correction coefficient as the correction coefficient "C" along with a deviation of the hue "H" from the target color.

The correction coefficient "C" obtained by the correction coefficient obtaining unit 80 is output to the third brightness signal generation unit 74-4.

The first brightness signal "Y1", the second brightness signal "Y2", and the mixing ratio "Ratio" are provided to the third brightness signal generation unit 74-4 as other inputs. The third brightness signal generation unit 74-4 generates the third brightness signal "Y" by calculating the weighted mean of the first brightness signal "Y1" and the second brightness signal "Y2" based on the mixing ratio "Ratio" and the correction coefficient "C".

Below, [Expression 16] is one example of a calculation expression for calculating the third brightness signal "Y" by calculating the weighted mean of the first brightness signal "Y1" and the second brightness signal "Y2" based on the mixing ratio "Ratio" and the correction coefficient "C".

$$Y=Y1\times(1-Ratio\times C)+Y2\times Ratio\times C \quad [\text{Expression 16}]$$

It is difficult to accurately set the hue of the target color using only the second coefficients "Kr2, Kg2, and Kb2" for generating the second brightness signal "Y2". However, according to the fourth embodiment, the hue of the target color of the subject can be more accurately set.

[Fourth Embodiment of Image Processing Method]

Figure 16:
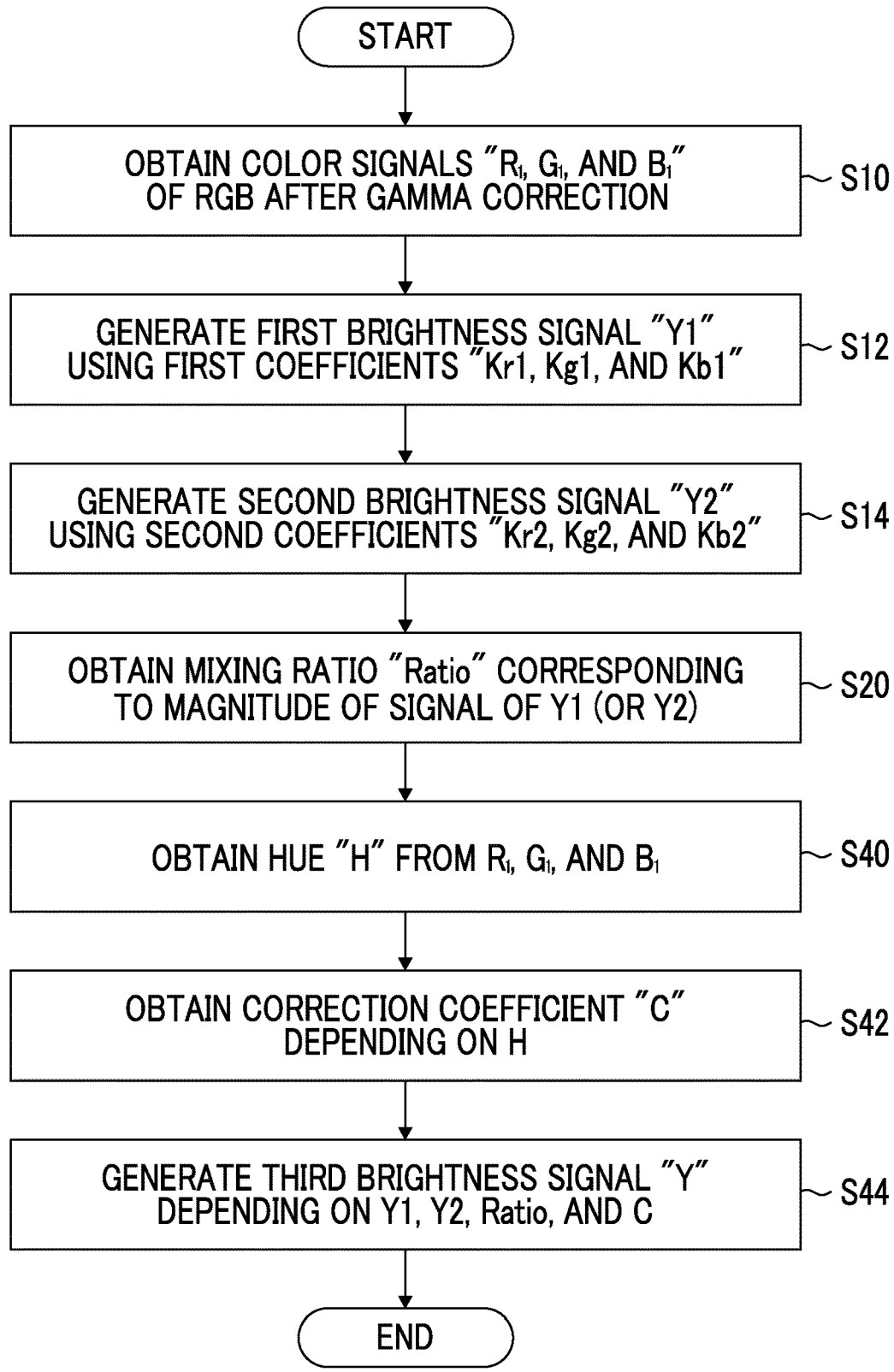
FIG. 16 is a flowchart illustrating a fourth embodiment of an image processing method performed by the brightness and color difference conversion processing unit illustrated in FIG. 14.

FIG. 16 is a flowchart illustrating a fourth embodiment of the image processing method performed by the brightness and color difference conversion processing unit 65-4. In FIG. 16, common steps in the second embodiment illustrated in FIG. 11 will be designated by the same step numbers, and detailed description of such steps will not be repeated.

The image processing method of the fourth embodiment illustrated in FIG. 16 is different such that processes of step S40, step S42, and step S44 are performed instead of the process of step S22 of the second embodiment illustrated in FIG. 11.

In FIG. 16, the hue calculation unit 78 calculates (obtains) the hue "H" for each pixel based on the color signals "$R_1$, $G_1$, and $B_1$" after the gamma conversion (step S40).

The correction coefficient obtaining unit 80 obtains the correction coefficient "C" corresponding to the hue "H" obtained in step S40 (step S42). The correction coefficient "C" is a correction coefficient that is the highest in a case where the hue "H" corresponding to the input color signals "$R_1$, $G_1$, and $B_1$" is the hue matching the target color and is decreased along with a deviation of the hue "H" from the target color.

Next, the third brightness signal generation unit 74 generates the third brightness signal "Y" by calculating the weighted mean (refer to [Expression 16]) of the first brightness signal "Y1" and the second brightness signal "Y2" respectively generated in steps S12 and S14 depending on the mixing ratio "Ratio" and the correction coefficient "C" obtained in step S20 and step S40 (step S44).

Accordingly, the hue of the target color can be more accurately set, and the third brightness signal in which the brightness of the target color is controlled can be generated. In addition, it is possible not to affect the color (the saturation and the hue).

Fifth Embodiment

Figure 17:
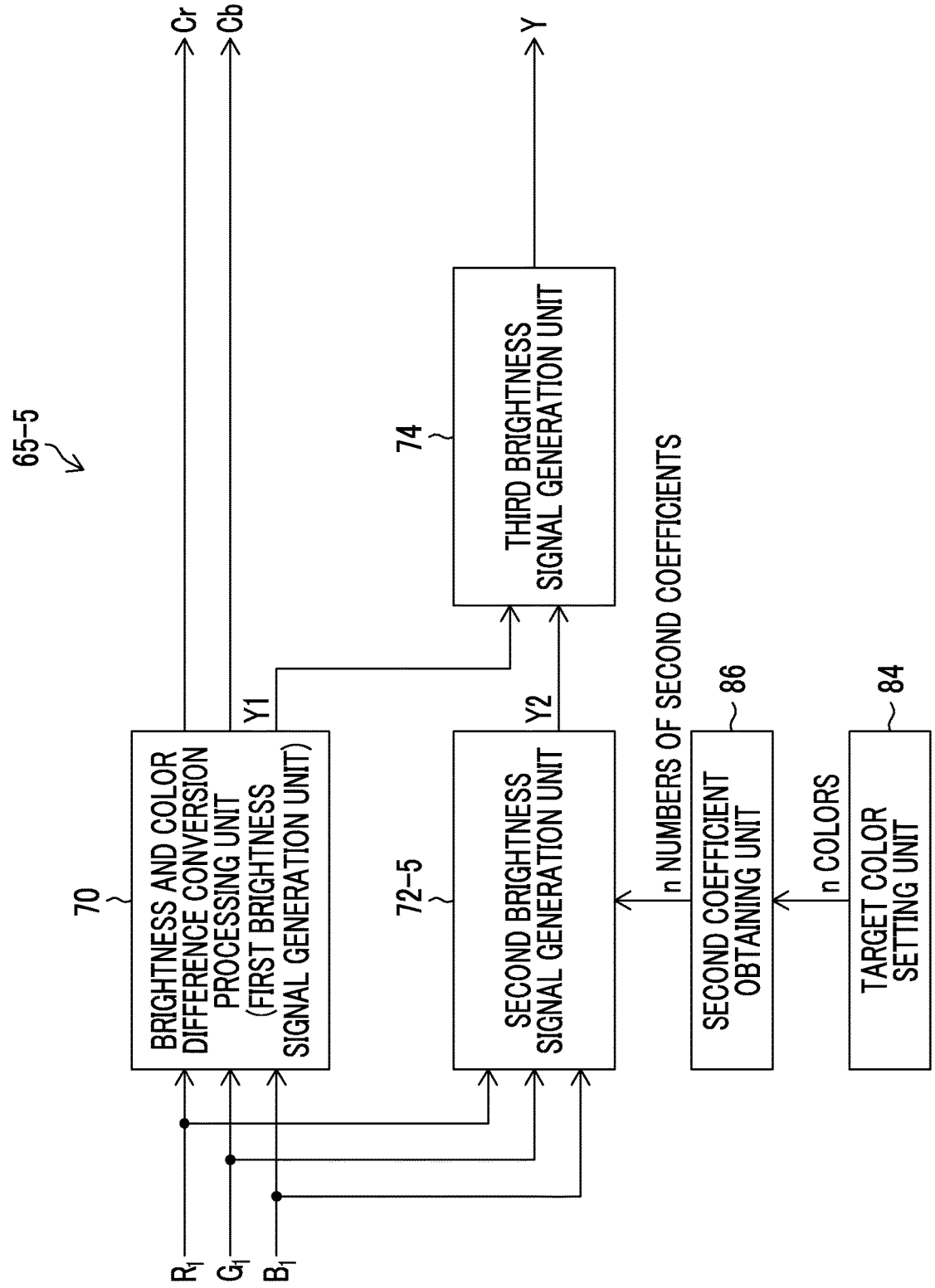
FIG. 17 is a block diagram illustrating a brightness and color difference conversion processing unit of a fifth embodiment.

FIG. 17 is a block diagram illustrating a brightness and color difference conversion processing unit 65-5 of the fifth embodiment. In FIG. 17, common parts in the brightness and color difference conversion processing unit 65-1 of the first embodiment illustrated in FIG. 6 will be designated by the same reference signs, and detailed description of such parts will not be repeated.

The difference between the brightness and color difference conversion processing unit 65-5 of the fifth embodiment illustrated in FIG. 17 and the brightness and color difference conversion processing unit 65-1 of the first embodiment is addition of a target color setting unit 84 and a second coefficient obtaining unit 86 and a method of generating the second brightness signal "Y2" by a second brightness signal generation unit 72-5.

In FIG. 17, the target color setting unit 84 can set n numbers (n colors) of target colors at the same time by a user operation in a case where n denotes an integer greater than or equal to 2. Information indicating n target colors set by the target color setting unit 84 is output to the second coefficient obtaining unit 86.

The second coefficient obtaining unit 86 obtains n numbers (n sets of) of second coefficients "Kr2, Kg2, and Kb2" respectively corresponding to the n target colors based on the information indicating the n target colors. The second coefficients "Kr2, Kg2, and Kb2" are prepared in advance for each target color. In a case where the n target colors are set at the same time, the second coefficient obtaining unit 86 obtains n numbers of second coefficients "Kr2, Kg2, and Kb2" respectively corresponding to the n target colors set at the same time and outputs the n numbers of second coefficients "Kr2, Kg2, and Kb2" to the second brightness signal generation unit 72-5.

The color signals "$R_1$, $G_1$, and $B_1$" after the gamma conversion are provided to the second brightness signal generation unit 72-5 as another input. The second brightness signal generation unit 72-5 generates n numbers of brightness signals as candidates of the second brightness signal "Y2" based on the color signals "$R_1$, $G_1$, and $B_1$" and the n numbers of second coefficients "Kr2, Kg2, and Kb2" and outputs the lowest brightness signal among the n numbers of brightness signals to the third brightness signal generation unit 74 as the second brightness signal "Y2".

The reason is that the second coefficients "Kr2, Kg2, and Kb2" corresponding to the target color are set as coefficients such that the generated brightness signal is decreased as the color signals "$R_1$, $G_1$, and $B_1$" after the gamma conversion approach the target color. The lowest brightness signal among the n numbers of brightness signals generated at the same time corresponds to any of the n numbers of target colors.

The third brightness signal generation unit 74 generates the third brightness signal "Y" in which the brightness of the n target colors is controlled based on the first brightness signal "Y1" input from the brightness and color difference conversion processing unit 70 (first brightness signal generation unit) and the second brightness signal "Y2" input from the second brightness signal generation unit 72-5.

Accordingly, brightness corresponding to a plurality of target colors of different hues can be controlled at the same time.

[Fifth Embodiment of Image Processing Method]

Figure 18:
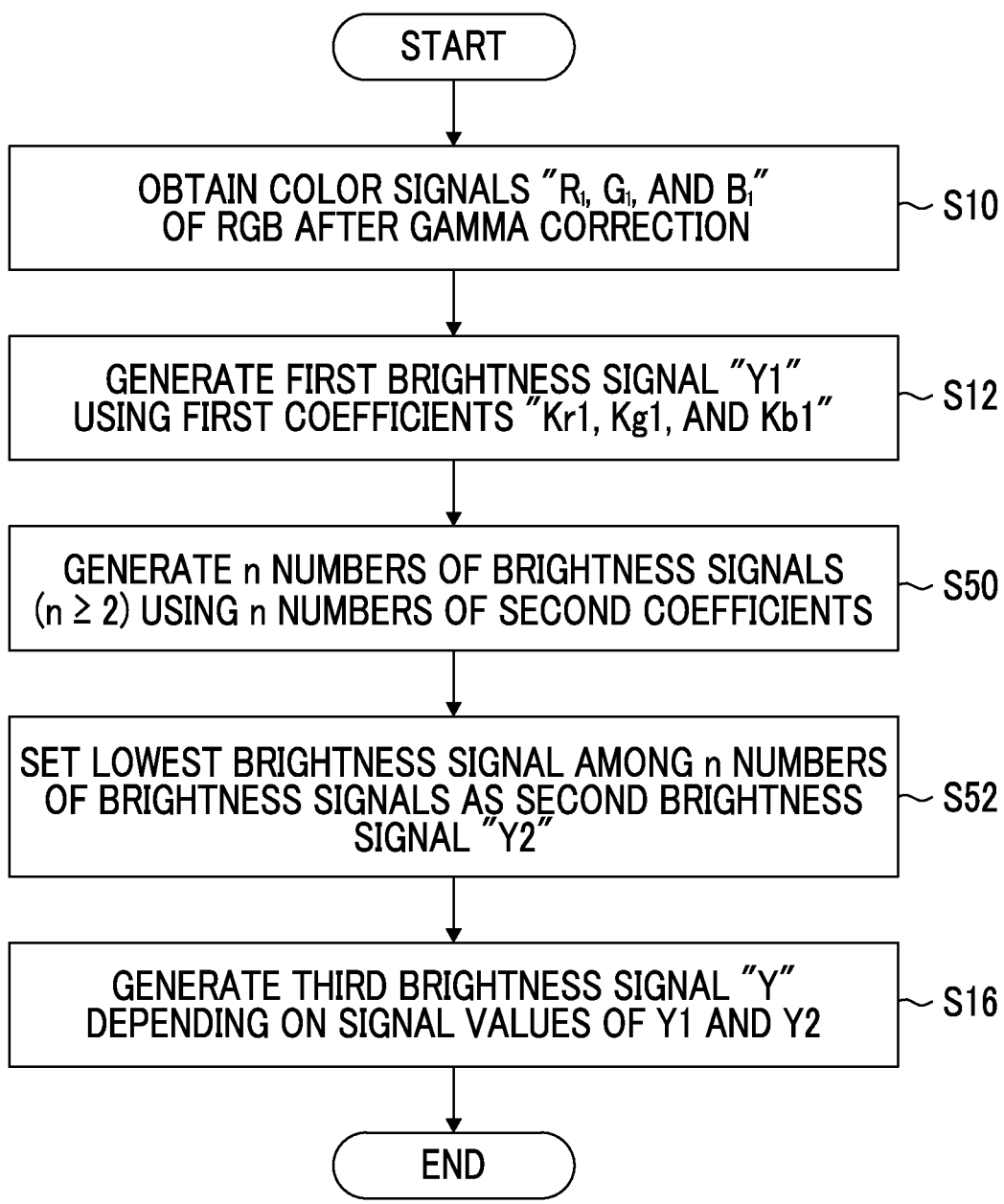
FIG. 18 is a flowchart illustrating a fifth embodiment of an image processing method performed by the brightness and color difference conversion processing unit illustrated in FIG. 17.

FIG. 18 is a flowchart illustrating a fifth embodiment of the image processing method performed by the brightness and color difference conversion processing unit 65-5. In FIG. 18, common steps in the first embodiment illustrated in FIG. 7 will be designated by the same step numbers, and detailed description of such steps will not be repeated.

The image processing method of the fifth embodiment illustrated in FIG. 18 is different such that processes of step S50 and step S52 are performed instead of the process of step S14 of the first embodiment illustrated in FIG. 7.

In FIG. 18, the second brightness signal generation unit 72-5 obtains the n numbers of second coefficients "Kr2, Kg2, and Kb2" respectively corresponding to the n target colors from the second coefficient obtaining unit 86 and generates the n numbers of brightness signals based on the color signals "$R_1$, $G_1$, and $B_1$" after the gamma conversion and the n numbers of second coefficients "Kr2, Kg2, and Kb2" (step S50).

Next, the second brightness signal generation unit 72-5 outputs the lowest brightness signal among the n numbers of generated brightness signals as the second brightness signal "Y2" (step S52).

The third brightness signal generation unit 74 generates the third brightness signal "Y" in which the brightness of the n target colors is controlled based on the first brightness signal "Y1" and the second brightness signal "Y2" obtained in step S12 and step S52 (step S16).

Accordingly, brightness corresponding to a plurality of target colors of different hues can be controlled at the same time.

Sixth Embodiment

Figure 19:
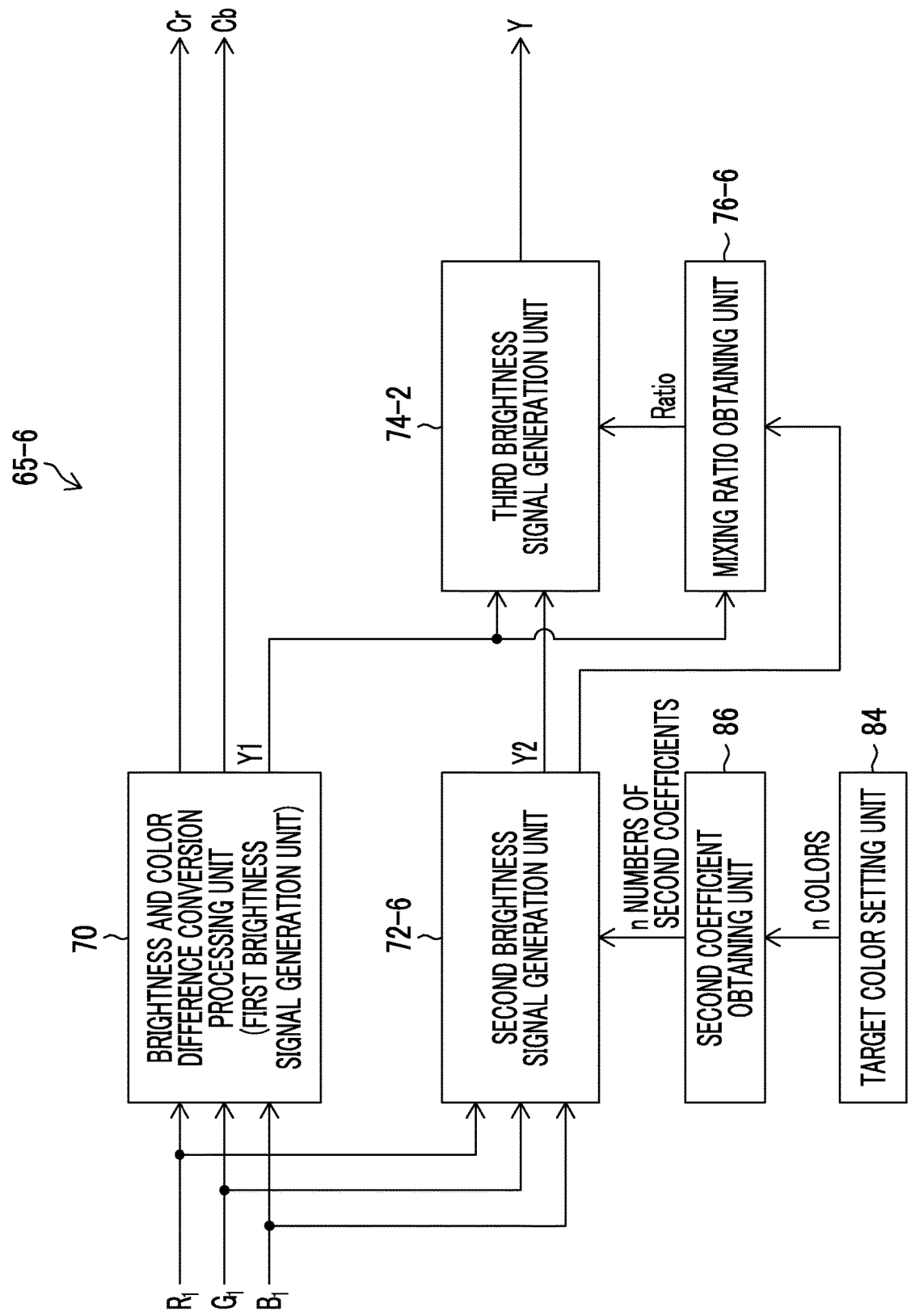
FIG. 19 is a block diagram illustrating a brightness and color difference conversion processing unit of a sixth embodiment.

FIG. 19 is a block diagram illustrating a brightness and color difference conversion processing unit 65-6 of a sixth embodiment. In FIG. 19, common parts in the brightness and color difference conversion processing unit 65-5 of the fifth embodiment illustrated in FIG. 17 will be designated by the same reference signs, and detailed description of such parts will not be repeated.

The difference between the brightness and color difference conversion processing unit 65-6 of the sixth embodiment illustrated in FIG. 19 and the brightness and color difference conversion processing unit 65-5 of the fifth embodiment is addition of a mixing ratio obtaining unit 76-6 and the functions of a second brightness signal generation unit 72-6 and the third brightness signal generation unit 74-2.

The common part of the second brightness signal generation unit 72-6 in the fourth embodiment is the generation of the n numbers of brightness signals as candidates of the second brightness signal "Y2" based on the color signals "$R_1$, $G_1$, and $B_1$" and the n numbers of second coefficients "Kr2, Kg2, and Kb2" and the output of the lowest brightness signal among the n numbers of brightness signals to the third brightness signal generation unit 74 as the second brightness signal "Y2" in the same manner as the fifth embodiment. Furthermore, the second brightness signal generation unit 72-6 outputs information (information related to the target color) indicating whether or not the second brightness signal "Y2" as the lowest brightness signal corresponds to any of the n numbers of target colors to the mixing ratio obtaining unit 76-6. The second brightness signal generation unit 72-6 knows the second coefficients that the second brightness signal "Y2" as the lowest brightness signal among the n numbers of brightness signals is generated based on among the n numbers of second coefficients "Kr2, Kg2, and Kb2". Thus, the second brightness signal generation unit 72-6 can obtain the information related to the target color corresponding to the second brightness signal "Y2" as the lowest brightness signal.

The mixing ratio obtaining unit 76-6 obtains the mixing ratio "Ratio" corresponding to the magnitude of the first brightness signal "Y1" using a table or a relational expression that corresponds to the target color and shows a relationship between the first brightness signal "Y1" and the mixing ratio "Ratio" in the same manner as the mixing ratio obtaining unit 76 of the second embodiment illustrated in FIG. 8. Furthermore, in a case where the n numbers of target colors are set by the target color setting unit 84, the mixing ratio obtaining unit 76-6 of the present example obtains n numbers of mixing ratios "Ratio" using n numbers of tables or relational expressions corresponding to the n numbers of set target colors. The mixing ratio obtaining unit 76-6 selects one mixing ratio "Ratio" from the n numbers of mixing ratios "Ratio" obtained in the above manner based on the information related to the target color (target color corresponding to the second brightness signal "Y2" output from the second brightness signal generation unit 72-6) input from the second brightness signal generation unit 72-6, and outputs the selected mixing ratio "Ratio" to the third brightness signal generation unit 74-2.

Figure 20:
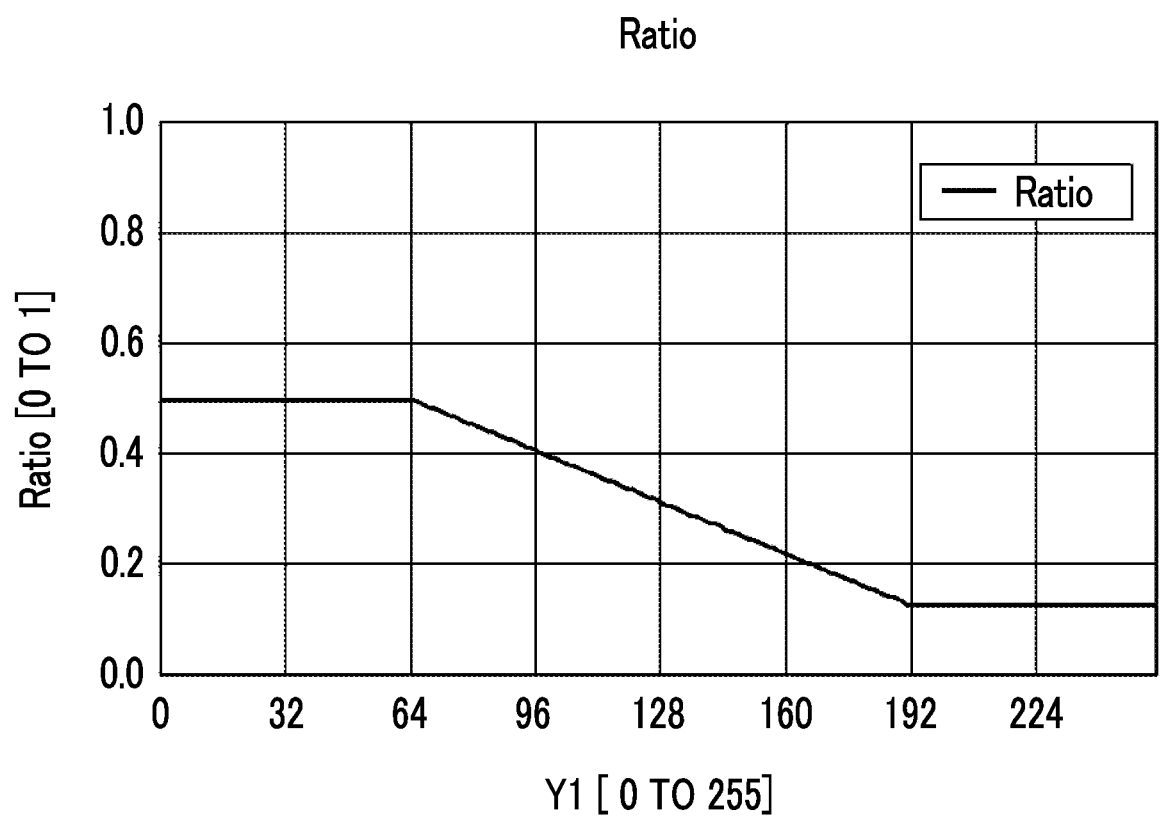
FIG. 20 is a graph illustrating another example of the relationship between the magnitude of the first brightness signal "Y1" and the mixing ratio "Ratio".

For example, in a case where two target colors (a first target color and a second target color) are set by the target color setting unit 84, the mixing ratio obtaining unit 76-6 obtains two mixing ratios "Ratio" (a first mixing ratio "Ratio" and a second mixing ratio "Ratio") corresponding to the magnitude of the first brightness signal "Y1" using a table or a relational expression corresponding to the first target color (for example, the table or the relational expression corresponding to the graph in FIG. 9) and a table or a relational expression corresponding to the second target color (for example, a table or a relational expression corresponding to the graph in FIG. 20). In a case where the second brightness signal "Y2" corresponding to the first target color is output from the second brightness signal generation unit 72-6, the first mixing ratio "Ratio" is output to the third brightness signal generation unit 74-2. In a case where the second brightness signal "Y2" corresponding to the second target color is output, the second mixing ratio "Ratio" is output to the third brightness signal generation unit 74-2.

In the present example, in a case where the n numbers of target colors are set by the target color setting unit 84, the n numbers of mixing ratios "Ratio" are obtained using the tables or the relational expressions corresponding to the n numbers of target colors. The mixing ratio "Ratio" is selected from the n numbers of mixing ratios "Ratio" corresponding to any target color to which the second brightness signal "Y2" corresponds. However, the present invention is not limited to the example. In a case where the n numbers of target colors are set by the target color setting unit 84, the mixing ratio obtaining unit 76-6 may select any one table or one relational expression from the n numbers of tables or relational expressions corresponding to the n numbers of set target colors depending on any target color to which the second brightness signal "Y2" corresponds, and may obtain the mixing ratio "Ratio" corresponding to the magnitude of the first brightness signal "Y1" using the selected table or the relational expression.

The third brightness signal generation unit 74-2 generates the third brightness signal "Y" by calculating the weighted mean of the first brightness signal "Y1" and the second brightness signal "Y2" based on the mixing ratio "Ratio" input from the mixing ratio obtaining unit 76-6.

Accordingly, brightness corresponding to a plurality of target colors of different hues can be controlled at the same time, and different brightness can be controlled based on the target color.

[Sixth Embodiment of Image Processing Method]

Figure 21:
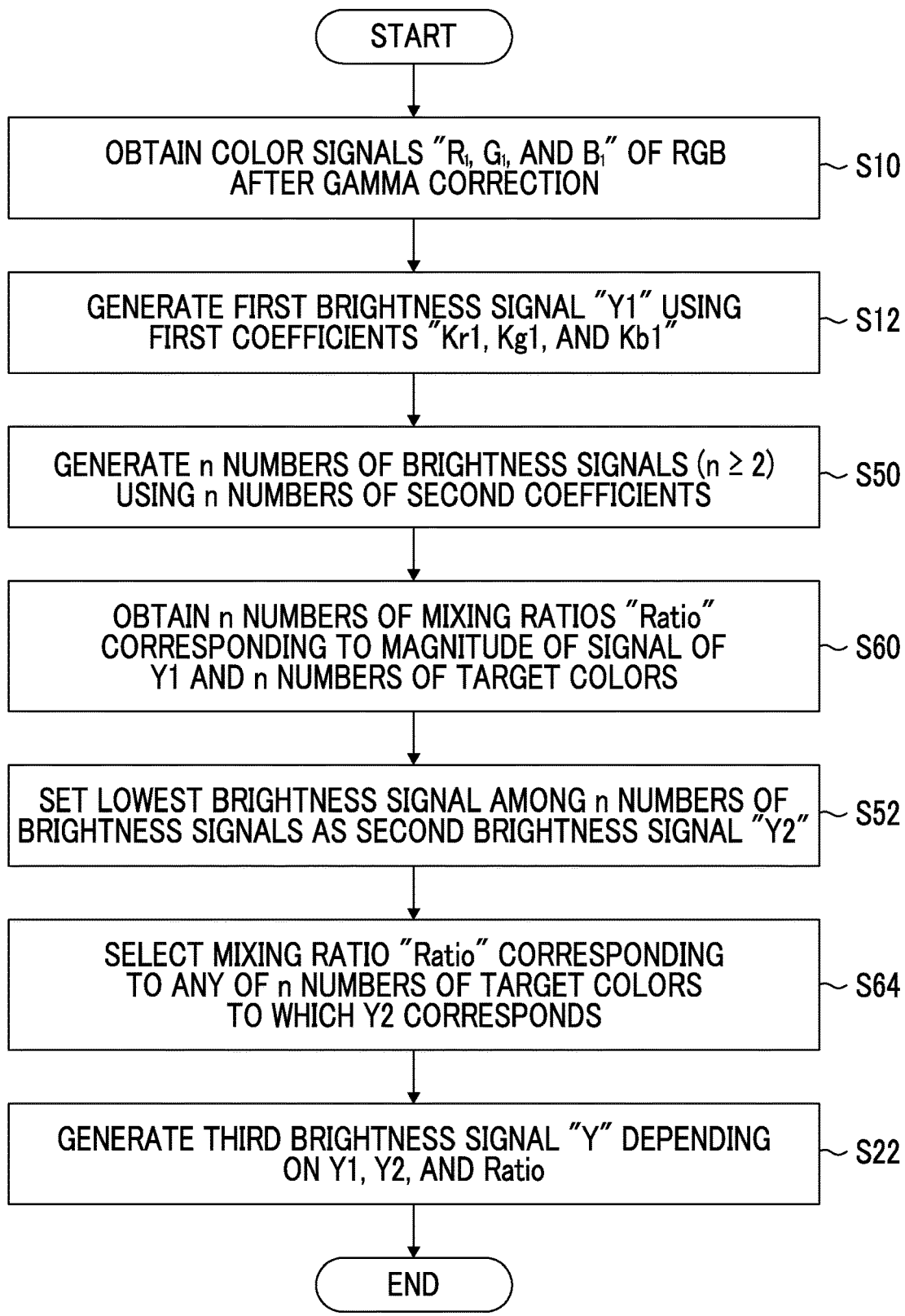
FIG. 21 is a flowchart illustrating a sixth embodiment of an image processing method performed by the brightness and color difference conversion processing unit illustrated in FIG. 19.

FIG. 21 is a flowchart illustrating a sixth embodiment of the image processing method performed by the brightness and color difference conversion processing unit 65-6. In FIG. 21, common steps in the fifth embodiment illustrated in FIG. 18 will be designated by the same step numbers, and detailed description of such steps will not be repeated.

The image processing method of the sixth embodiment illustrated in FIG. 21 is different from the fifth embodiment in that processes of step S60 and step S64 are added, and the process of step S22 is performed instead of step S16.

In FIG. 21, in a case where the n numbers of target colors are set by the target color setting unit 84, the mixing ratio obtaining unit 76-6 obtains the n numbers of mixing ratios "Ratio" depending on the magnitude of the first brightness signal "Y1" acquired in step S12 using the n numbers of tables or relational expressions corresponding to the n numbers of set target colors (step S60).

The second brightness signal generation unit 72-5 generates n brightness signals based on the color signals "$R_1$, $G_1$, and $B_1$" after the gamma conversion and the n numbers of second coefficients "Kr2, Kg2, and Kb2" corresponding to the n numbers of target colors and outputs the lowest brightness signal among the n numbers of brightness signals as the second brightness signal "Y2" (step S52). The mixing ratio obtaining unit 76-6 selects the corresponding mixing ratio "Ratio" from the n numbers of mixing ratios "Ratio" depending on any of the n numbers of target colors to which the second brightness signal "Y2" generated in step S52 corresponds (step S64).

The third brightness signal generation unit 74-2 generates the third brightness signal "Y" by calculating the weighted mean of the first brightness signal "Y1" and the second brightness signal "Y2" respectively generated in steps S12 and S52 depending on the mixing ratio "Ratio" obtained in step S64 (step S22).

Accordingly, brightness corresponding to a plurality of target colors of different hues can be controlled at the same time, and different brightness can be controlled based on the target color.

Modification Example

The imaging apparatus 10 is for illustrative purposes. The present invention can be applied to other configurations. Each functional configuration can be appropriately implemented by any hardware, software, or a combination of both hardware and software. For example, the present invention can be applied to an image processing apparatus including the processing unit (the image processing unit 24; particularly, the brightness and color difference conversion processing unit 65 or the like) of the imaging apparatus 10, an image processing program causing a computer to execute the image processing method (steps and process procedures) in the processing unit of the imaging apparatus 10, a computer readable recording medium (non-transitory recording medium) on which the image processing program is recorded, or various computers on which the image processing program can be installed.

In addition, in a case where the present invention is applied to an external image processing apparatus such as the computer, it is preferable that the external image processing apparatus obtains RAW data from the imaging apparatus on which the RAW data can be recorded, and performs a RAW development process on the obtained RAW data and performs the image processing according to the embodiment of the present invention.

Furthermore, an aspect of the imaging apparatus to which the present invention can be applied is not limited to the imaging apparatus 10 illustrated in FIG. 1. For example, a mobile phone, a smartphone, personal digital assistants (PDA), and a portable game console having a camera function are exemplified. Hereinafter, one example of the smartphone to which the present invention can be applied will be described.

<Configuration of Smartphone>

Figure 22:
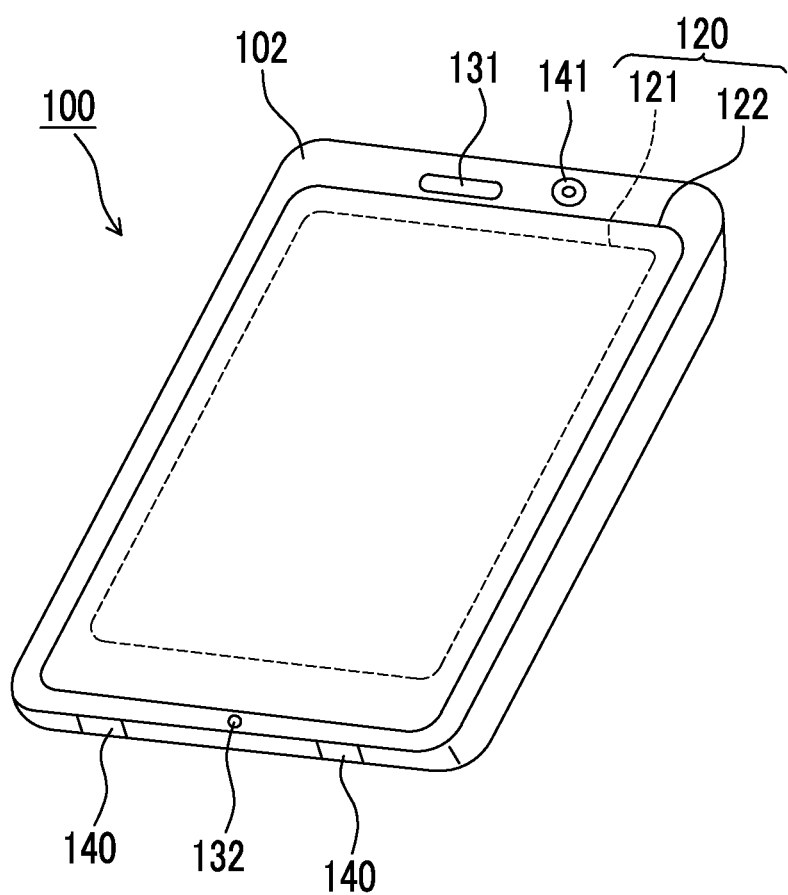
FIG. 22 is a perspective view illustrating the exterior of a smartphone.

FIG. 22 is a diagram illustrating the exterior of the smartphone as one embodiment of the imaging apparatus.

A smartphone 100 illustrated in FIG. 22 includes a casing 102 having a flat plate shape. A display and input unit 120 in which a display panel 121 as a display unit and an operation panel 122 as an input unit are formed as a single unit is disposed on one surface of the casing 102. In addition, the casing 102 comprises a speaker 131, a microphone 132, an operation unit 140, and a camera unit 141 (imaging unit). The configuration of the casing 102 is not for limitation purposes. For example, a configuration in which the display unit and the input unit are independently disposed can be employed. A configuration including a folded structure or a sliding mechanism can be employed.

Figure 23:
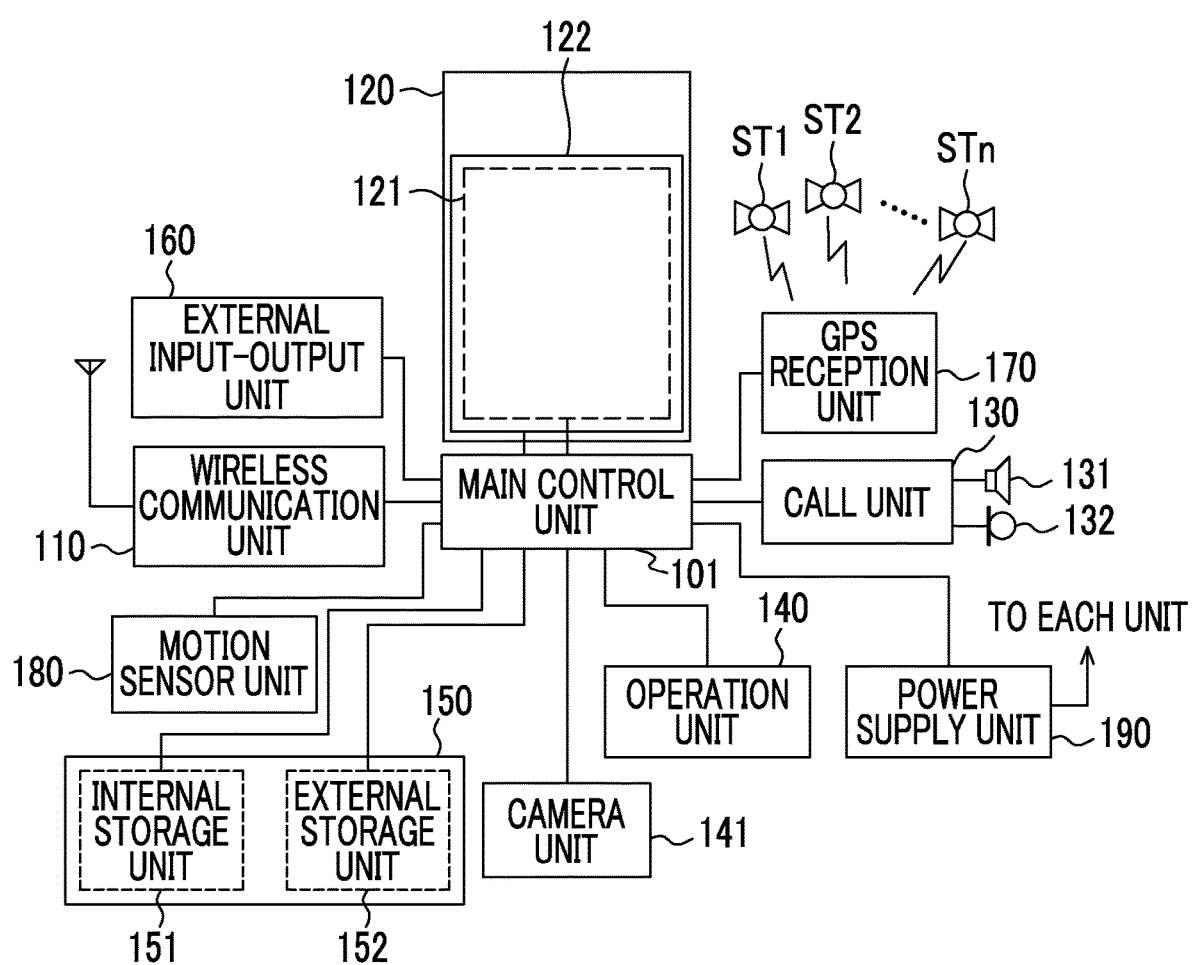
FIG. 23 is a block diagram illustrating a configuration of the smartphone.

FIG. 23 is a block diagram illustrating an internal configuration of the smartphone 100 illustrated in FIG. 22. As illustrated in FIG. 23, main constituents of the smartphone 100 comprise a wireless communication unit 110, the display and input unit 120, a call unit 130, the operation unit 140, the camera unit 141, a storage unit 150, an external input-output unit 160 (output unit), a GPS reception unit 170, a motion sensor unit 180, a power supply unit 190, and a main control unit 101. In addition, a main function of the smartphone 100 includes a wireless communication function of performing mobile wireless communication with a base station apparatus through a mobile communication network.

The wireless communication unit 110 performs wireless communication with the base station apparatus connected to the mobile communication network in accordance with an instruction from the main control unit 101. By using the wireless communication, transmission and reception of various file data such as voice data and image data, electronic mail data, and the like and reception of web data, streaming data, and the like are performed.

The display and input unit 120 is a so-called touch panel comprising the operation panel 122 arranged on the screen of the display panel 121. The display and input unit 120 visually delivers information to a user by displaying an image (a still image and a motion image), text information, and the like and detects a user operation performed on the displayed information under control of the main control unit 101. The operation panel 122 will be referred to as a touch panel for convenience.

The display panel 121 uses a liquid crystal display (LCD), an organic electro-luminescence display (OELD), or the like as a display device. The operation panel 122 is a device that is disposed in a state where the image displayed on the display surface of the display panel 121 can be visually recognized, and detects one or a plurality of coordinates operated by a finger of the user or a stylus. In a case where the device is operated by the finger of the user or the stylus, the operation panel 122 outputs a detection signal generated based on the operation to the main control unit 101. Next, the main control unit 101 detects an operation position (coordinates) on the display panel 121 based on the received detection signal.

The display panel 121 and the operation panel 122 of the smartphone 100 illustrated in FIG. 22 constitute the display and input unit 120 as a single unit. The operation panel 122 is arranged to completely cover the display panel 121. In a case where such an arrangement is employed, the operation panel 122 may have a function of detecting the user operation even in a region outside the display panel 121. In other words, the operation panel 122 may comprise a detection region (hereinafter, referred to as a "display region") for an overlapping part in overlap with the display panel 121 and a detection region (hereinafter, referred to as a "non-display region") for the other peripheral part not in overlap with the display panel 121.

While the size of the display region may completely match the size of the display panel 121, both sizes do not necessarily need to match. In addition, the operation panel 122 may comprise two sensitive regions including the peripheral part and the other inner part. Furthermore, the width of the peripheral part is appropriately designed depending on the size of the casing 102. Furthermore, a position detection method employed in the operation panel 122 is exemplified by a matrix switch method, a resistive film method, a surface acoustic wave method, an infrared method, an electromagnetic induction method, an electrostatic capacitive method, and the like. Any method may be employed.

The call unit 130 comprises the speaker 131 and the microphone 132. The call unit 130 converts the voice of the user input through the microphone 132 into voice data processable in the main control unit 101 and outputs the voice data to the main control unit 101, or decodes voice data received by the wireless communication unit 110 or the external input-output unit 160 and outputs the decoded voice data from the speaker 131. In addition, as illustrated in FIG. 22, for example, the speaker 131 and the microphone 132 can be mounted on the same surface as the surface on which the display and input unit 120 is disposed.

The operation unit 140 is a hardware key in which a key switch or the like is used, and receives an instruction from the user. For example, as illustrated in FIG. 22, the operation unit 140 is a push-button type switch that is mounted on a side surface of the casing 102 of the smartphone 100, and is set to be in a switch ON state in a case where the operation unit 140 pressed by the finger or the like and is set to be in a switch OFF state by a restoring force of a spring or the like in a case where the finger is released.

The storage unit 150 stores a control program and control data of the main control unit 101, game application software, various application software including the image processing program according to the embodiment of the present invention, address data in which the name, the telephone number, and the like of a communication counterpart are associated, data of transmitted and received electronic mails, web data downloaded by web browsing, downloaded contents data, and the like and temporarily stores streaming data and the like.

In addition, the storage unit 150 is configured with an internal storage unit 151 embedded in the smartphone and an external storage unit 152 including a slot for detachable external memory. Each of the internal storage unit 151 and the external storage unit 152 constituting the storage unit 150 is implemented using a storage medium such as a memory of a flash memory type, a hard disk type, a multimedia card micro type, or a card type, a random access memory (RAM), or a read only memory (ROM).

The external input-output unit 160 acts as an interface for all external apparatuses connected to the smartphone 100 and is directly or indirectly connected to other external apparatuses by communication and the like (for example, Universal Serial Bus (USB) and IEEE 1394) or networks (for example, a network, a wireless local area network (LAN), Bluetooth (registered trademark), radio frequency identification (RFID), infrared communication (infrared data association (IrDA)), Ultra Wideband (UWB) (registered trademark), and ZigBee (registered trademark)).

For example, the external apparatuses connected to the smartphone 100 include a wired/wireless headset, a wired/wireless external charger, a wired/wireless data port, a memory card or a subscriber identity module (SIM)/user identity module (UIM) card connected through a card socket, an external audio and video apparatus connected through an audio and video input/output (I/O) terminal, an external audio and video apparatus connected in a wired/wireless manner, a smartphone, a personal computer, a personal digital assistant (PDA), and an earphone. The external input-output unit 160 may be configured to deliver data transferred from the external apparatuses to each constituent inside the smartphone 100 or transfer data inside the smartphone 100 to the external apparatuses.

The GPS reception unit 170 receives GPS signals transmitted from GPS satellites ST1, ST2 to STn, executes a position measurement calculation process based on the plurality of received GPS signals, and obtains positional information (GPS information) specified by the latitude, the longitude, and the altitude of the smartphone 100 in accordance with the instruction from the main control unit 101. In a case where the positional information can be obtained from the wireless communication unit 110 and/or the external input-output unit 160 (for example, a wireless LAN), the GPS reception unit 170 can detect a position using the positional information.

The motion sensor unit 180 comprises, for example, a 3-axis acceleration sensor and detects a physical motion of the smartphone 100 in accordance with the instruction from the main control unit 101. By detecting the physical motion of the smartphone 100, the movement direction and the acceleration of the smartphone 100 are detected. The result of the detection is output to the main control unit 101.

The power supply unit 190 supplies power stored in a battery (not illustrated) to each unit of the smartphone 100 in accordance with the instruction from the main control unit 101.

The main control unit 101 comprises a microprocessor. The main control unit 101 operates in accordance with the control program and the control data stored in the storage unit 150 and manages and controls each unit of the smartphone 100. In addition, the main control unit 101 has a mobile communication control function of controlling each unit of a communication system and an application processing function in order to perform voice communication and data communication through the wireless communication unit 110.

The application processing function is implemented by operating the main control unit 101 in accordance with the application software stored in the storage unit 150. For example, the application processing function includes an infrared communication function of performing data communication with an opposing apparatus by controlling the external input-output unit 160, an electronic mail function of transmitting and receiving electronic mails, a web browsing function of browsing a web page, and also an image processing function according to the embodiment of the present invention.

In addition, the main control unit 101 has an image processing function such as displaying a video on the display and input unit 120 based on image data such as reception data or downloaded streaming data (data of a still image or a motion image). In addition, the image processing function includes the image processing performed by the image processing unit 24 illustrated in FIG. 4 and the like.

Furthermore, the main control unit 101 executes display control for the display panel 121 and operation detection control for detecting the user operation performed through the operation unit 140 or the operation panel 122.

By executing the display control, the main control unit 101 displays an icon for starting the application software or a software key such as a scroll bar or displays a window for composing an electronic mail. The scroll bar is a software key for receiving an instruction to move a display part of an image for a large image or the like that is not accommodated in the display region of the display panel 121.

In addition, by executing the operation detection control, the main control unit 101 detects the user operation performed through the operation unit 140, receives an operation performed on the icon through the operation panel 122 or an input of a text string in an input field in the window, or receives a scrolling request for the display image through the scroll bar.

Furthermore, by executing the operation detection control, the main control unit 101 has a touch panel control function of determining whether the operation position on the operation panel 122 corresponds to the overlapping part (display region) in overlap with the display panel 121 or the other peripheral part (non-display region) not in overlap with the display panel 121 and controlling the sensitive region of the operation panel 122 and the display position of the software key.

In addition, the main control unit 101 can detect a gesture operation performed on the operation panel 122 and execute a function set in advance depending on the detected gesture operation. The gesture operation is not a simple touch operation in the related art and means an operation of drawing a trajectory by the finger or the like, an operation of specifying a plurality of positions at the same time, or an operation of drawing a trajectory from at least one of the plurality of positions by combining those operations.

The camera unit 141 can convert image data obtained by imaging into compressed image data such as joint photographic experts group (JPEG) and record the image data on the storage unit 150 or output the image data through the external input-output unit 160 or the wireless communication unit 110 under control of the main control unit 101. While the camera unit 141 is mounted on the same surface as the display and input unit 120 in the smartphone 100 as illustrated in FIG. 22, the mounting position of the camera unit 141 is not for limitation purposes. The camera unit 141 may not be mounted on the surface of the casing 102 on which the display and input unit 120 is disposed, and be mounted on the rear surface of the casing 102. Alternatively, a plurality of camera units 141 may be mounted on the casing 102. In a case where the plurality of camera units 141 are mounted, imaging may be performed by a single camera unit 141 by switching the camera unit 141 to be used in imaging, or imaging may be performed using the plurality of camera units 141 at the same time.

In addition, the camera unit 141 can be used for various functions of the smartphone 100. For example, the image obtained by the camera unit 141 may be displayed on the display panel 121. The image captured and obtained by the camera unit 141 may be used as one of operation input methods for the operation panel 122. In addition, in the detection of the position by the GPS reception unit 170, the position may be detected by referring to the image from the camera unit 141. Furthermore, a determination of the optical axis direction of the camera unit 141 of the smartphone 100 or a determination of the current usage environment can be performed by referring to the image from the camera unit 141 without using the 3-axis acceleration sensor or along with the 3-axis acceleration sensor. Apparently, the image from the camera unit 141 can be used in the application software.

Besides, data obtained by adding the positional information obtained by the GPS reception unit 170, voice information (may be converted into text information by performing voice text conversion by the main control unit or the like) obtained by the microphone 132, attitude information obtained by the motion sensor unit 180, or the like is added to the image data of the still picture or the motion picture can be recorded on the storage unit 150 or be output through the external input-output unit 160 or the wireless communication unit 110.

[Others]

While the control according to the embodiment of the present invention is performed using the brightness signal "Y" by converting the color signals "RGB" of three primary colors into the brightness signal "Y" and the color difference signals "Cb and Cr in the embodiments of the present invention, the control is not for limitation purposes. For example, the control may be performed using "L*" that indicates brightness in the L*a*b* color space.

Figure 24:
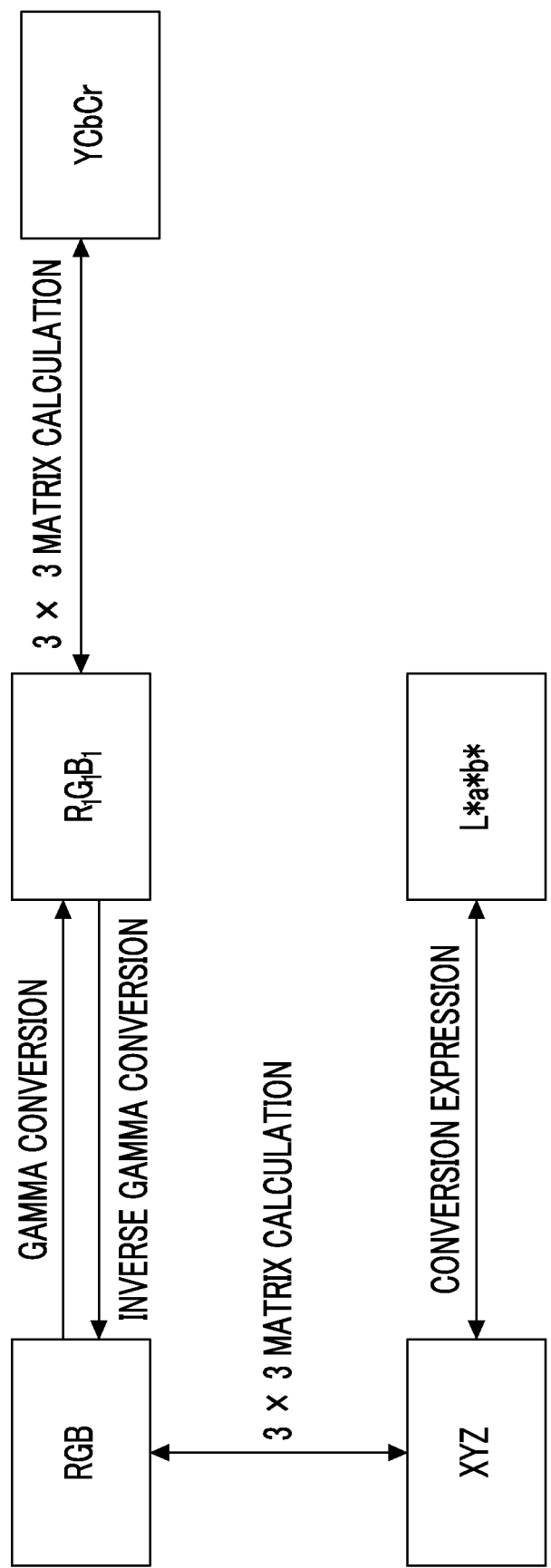
FIG. 24 is a diagram illustrating a relationship between various color spaces.

FIG. 24 is a diagram illustrating a relationship between various color spaces. The color signals "R, G, and B" in the RGB color space are converted into the color signals "$R_1$, $G_1$, and $B_1$" after the gamma conversion and the brightness signal and the color difference signals "Y, Cb, and Cr" by a matrix calculation based on a 3×3 coefficient matrix for YCbCr conversion.

The color signals "R, G, and B" in the RGB color space can be converted into values "X, Y, and Z" in the XYZ color space by a matrix calculation of the color signals "R, G, and B" and a 3×3 coefficient matrix for XYZ conversion. Furthermore, the values "X, Y, and Z" in the XYZ color space can be converted into three values "L*, a*, and b*" in the L*a*b* color space using a conversion expression.

<In Case of Embodying Present Invention Using Y of YCbCr>

In this case, the third brightness signal "Y" according to the embodiment of the present invention is not related to the calculation of the color difference signals "Cb and Cr". That is, the color difference signals "Cb and Cr" are values calculated from the color signals "$R_1$, $G_1$, and $B_1$" after the gamma conversion and a reference 3×3 coefficient matrix (coefficient matrix defined in BT.601, BT.709, or the like).

In the case of using a* and b* in the L*a*b* color space as the color difference signals, the color difference signals "a* and b*" are calculated using the third brightness signal "Y" according to the embodiment of the present invention. That is, the color difference signals "a* and b*" are calculated from "Y, Cb, and Cr" to which the third brightness signal "Y" is applied using the conversion expression in the relationship diagram illustrated in FIG. 24.

<In Case of Embodying Present Invention Using L* of L*a*b*>

In this case, the color difference signals "Cb and Cr" are calculated using the third brightness signal "L*" according to the embodiment of the present invention. That is, the calculation is performed from each of the values "L*, a*, and b*" to which the third brightness signal "L*" is applied using the conversion expression in the relationship diagram illustrated in FIG. 24.

Meanwhile, in the case of using a* and b* in the L*a*b* color space as the color difference signals, the third brightness signal "L*" according to the embodiment of the present invention is not related to the calculation of the color difference signals "a* and b*". That is, the color difference signals "a* and b*" are values "a* and b*" obtained by converting the values "X, Y, and Z" in the XYZ color space into the values "L*, a*, and b*" in the L*a*b* color space using the conversion expression.

In addition, the present invention is not limited to the embodiments. The first embodiment to the sixth embodiment can be appropriately combined, and various modifications can be made without departing from the spirit of the present invention.

EXPLANATION OF REFERENCES

1: strobe
2: shutter button
3: power supply/mode switch
4: mode dial
5: zoom button
5T: tele button
5W: wide button
6: cross button
7: MENU/OK button
8: playback button
9: BACK button
10: imaging apparatus
12: imaging lens
14: stop
15: mechanical shutter
16: imaging element
22: image input controller
24: image processing unit
26: compression/expansion processing unit
28: video encoder
30: liquid crystal monitor
32: sensor drive unit
33: shutter drive unit
34: stop drive unit
36: lens drive unit
38: operation unit
40: CPU
42: AF processing unit
44: AE detection unit
47: ROM
48: memory
50: VRAM
52: media controller
54: memory card
61: offset correction processing unit
62: WB correction processing unit
63: demosaicing processing unit
64: gamma-correction processing unit
65: brightness and color difference conversion processing unit
65-1 to 65-6, 70: brightness and color difference conversion processing unit
72: second brightness signal generation unit
72-5, 72-6: second brightness signal generation unit
74, 74-2, 74-3, 74-4: third brightness signal generation unit
75: brightness signal comparator
76, 76-6: mixing ratio obtaining unit
78: hue calculation unit
80: correction coefficient obtaining unit
82: correction coefficient setting unit
84: target color setting unit
86: second coefficient obtaining unit
100: smartphone
101: main control unit
102: casing
110: wireless communication unit
120: display and input unit
121: display panel
122: operation panel
130: call unit
131: speaker
132: microphone
140: operation unit
141: camera unit
150: storage unit
151: internal storage unit
152: external storage unit
160: external input-output unit
170: GPS reception unit
180: motion sensor unit
190: power supply unit

What is claimed is:

1. An image processing apparatus comprising:
a microprocessor;
wherein the microprocessor
obtains a first color signal, a second color signal, and a third color signal of three primary colors indicating a captured image;
generates a first brightness signal using the obtained first color signal, second color signal, and third color signal, and first coefficients including first coefficient correspond to the first color signal, first coefficient correspond to the second color signal, and first coefficient correspond to the third color signal, which are for generating a reference first brightness signal;
generates a second brightness signal using the obtained first color signal, second color signal, and third color signal, and second coefficients including second coefficient correspond to the first color signal, second coefficient correspond to the second color signal, and second coefficient correspond to the third color signal, which are obtained by decreasing a weight of a coefficient corresponding to a chromatic target color in the first coefficient; and
generates a third brightness signal in which a brightness of the chromatic target color is controlled based on the generated first brightness signal and second brightness signal.

2. The image processing apparatus according to claim 1, wherein the microprocessor
obtains a mixing ratio corresponding to a magnitude of the generated first brightness signal or second brightness signal, and
generates the third brightness signal by calculating a weighted mean of the first brightness signal and the second brightness signal based on the mixing ratio.

3. The image processing apparatus according to claim 2, wherein the microprocessor obtains the mixing ratio such that the ratio of the second brightness signal to the first brightness signal is decreased as the generated first brightness signal or second brightness signal is increased, and the ratio of the second brightness signal to the first brightness signal is increased as the generated first brightness signal or second brightness signal is decreased.

4. The image processing apparatus according to claim 2, wherein the microprocessor obtains the mixing ratio such that the ratio of the second brightness signal to the first brightness signal is increased as the generated first brightness signal or second brightness signal is increased, and the ratio of the second brightness signal to the first brightness signal is decreased as the generated first brightness signal or second brightness signal is decreased.

5. The image processing apparatus according to claim 2, wherein the microprocessor obtains the mixing ratio corresponding to the magnitude of the first brightness signal or the second brightness signal using a table or a relational expression showing a relationship between the magnitude of the first brightness signal or the second brightness signal and the mixing ratio.

6. The image processing apparatus according to claim 3, wherein the microprocessor obtains the mixing ratio corresponding to the magnitude of the first brightness signal or the second brightness signal using a table or a relational expression showing a relationship between the magnitude of the first brightness signal or the second brightness signal and the mixing ratio.

7. The image processing apparatus according to claim 4, wherein the microprocessor obtains the mixing ratio corresponding to the magnitude of the first brightness signal or the second brightness signal using a table or a relational expression showing a relationship between the magnitude of the first brightness signal or the second brightness signal and the mixing ratio.

8. The image processing apparatus according to claim 5, wherein the microprocessor obtains the mixing ratio corresponding to the magnitude of the first brightness signal or the second brightness signal using the table or the relational expression corresponding to the chromatic target color.

9. The image processing apparatus according to claim 2, further comprising:
wherein the microprocessor
sets a correction coefficient such that a weight of a hue of the chromatic target color is the highest, and the weight is decreased as the hue deviates from the chromatic target color;
calculates the hue from the first color signal, the second color signal, and the third color signal; and
obtains the corresponding correction coefficient depending on the hue,
generates the third brightness signal by calculating the weighted mean of the first brightness signal and the second brightness signal based on the mixing ratio and the correction coefficient.

10. The image processing apparatus according to claim 3, wherein the microprocessor
sets a correction coefficient such that a weight of a hue of the chromatic target color is the highest, and the weight is decreased as the hue deviates from the chromatic target color;
calculates the hue from the first color signal, the second color signal, and the third color signal; and
obtains the corresponding correction coefficient depending on the hue,
generates the third brightness signal by calculating the weighted mean of the first brightness signal and the second brightness signal based on the mixing ratio and the correction coefficient.

11. The image processing apparatus according to claim 4, wherein the microprcocessor
sets a correction coefficient such that a weight of a hue of the chromatic target color is the highest, and the weight is decreased as the hue deviates from the chromatic target color;
calculates the hue from the first color signal, the second color signal, and the third color signal; and
obtains the corresponding correction coefficient depending on the hue,
generates the third brightness signal by calculating the weighted mean of the first brightness signal and the second brightness signal based on the mixing ratio and the correction coefficient.

12. The image processing apparatus according to claim 1, wherein the microprocessor
sets the chromatic target color; and
calculates the second coefficients in which the weight of the coefficient corresponding to the chromatic target color is decreased, or reads the second coefficients corresponding to the set chromatic target color from a storage storing the second coefficients,
generates the second brightness signal using the obtained first color signal, second color signal, and third color signal, and the second coefficients.

13. The image processing apparatus according to claim 12, 
wherein the microprocessor
is capable of setting n numbers of the chromatic target colors at the same time in a case where n denotes an integer greater than or equal to 2,
obtains n sets of the second coefficients respectively corresponding to the n numbers of chromatic target colors in a case where the n numbers of chromatic target colors are set at the same time, and
generates n numbers of brightness signals based on the obtained first color signal, second color signal, and third color signal, and the n sets of second coefficients and sets the lowest brightness signal among the n numbers of brightness signals as the second brightness signal.

14. The image processing apparatus according to claim 13,
wherein the microprocessor
obtains a mixing ratio corresponding to a magnitude of the first brightness signal or the second brightness signal using a table or a relational expression which shows a relationship between the magnitude of the first brightness signal or the second brightness signal and the mixing ratio and corresponds to any of the n numbers of chromatic target colors to which the lowest brightness signal corresponds, from n numbers of the tables or the relational expressions respectively corresponding to the n numbers of chromatic target colors,
generates the third brightness signal by calculating a weighted mean of the first brightness signal and the second brightness signal based on the mixing ratio.

15. The image processing apparatus according to claim 1, wherein in a case where the second brightness signal is higher than the first brightness signal, the first brightness signal is output.

16. The image processing apparatus according to claim 1, wherein the total of the second coefficients respectively corresponding to the first color signal, the second color signal, and the third color signal is 1.

17. The image processing apparatus according to claim 1, wherein the first color signal, the second color signal, and the third color signal of three primary colors indicating the captured image are color signals after gamma conversion.

18. An imaging apparatus comprising:
an imaging optical system and an imaging element; and
the image processing apparatus according to claim 1,
wherein the microprocessor obtains the first color signal, the second color signal, and the third color signal of three primary colors indicating the captured image.

19. An image processing method comprising:
a step of obtaining a first color signal, a second color signal, and a third color signal of three primary colors indicating a captured image;
a step of generating a first brightness signal using the obtained first color signal, second color signal, and third color signal, and first coefficients including first coefficient correspond to the first color signal, first coefficient correspond to the second color signal, and first coefficient correspond to the third color signal, which are for generating the reference first brightness signal;
a step of generating a second brightness signal using the obtained first color signal, second color signal, and third color signal, and second coefficients including second coefficient correspond to the first color signal, second coefficient correspond to the second color signal, and second coefficient correspond to the third color signal, which are obtained by decreasing a weight of a coefficient corresponding to a chromatic target color in the first coefficients; and
a step of generating a third brightness signal in which a brightness of the chromatic target color is controlled based on the generated first brightness signal and second brightness signal.

20. A non-transitory computer readable medium for storing an image processing program causing a computer to execute:
a function of obtaining a first color signal, a second color signal, and a third color signal of three primary colors indicating a captured image;
a function of generating a first brightness signal using the obtained first color signal, second color signal, and third color signal, and first coefficients including first coefficient correspond to the first color signal, first coefficient correspond to the second color signal, and first coefficient correspond to the third color signal, which are for generating the reference first brightness signal;
a function of generating a second brightness signal using the obtained first color signal, second color signal, and third color signal, and second coefficients including second coefficient correspond to the first color signal, second coefficient correspond to the second color signal, and second coefficient correspond to the third color signal, which are obtained by decreasing a weight of a coefficient corresponding to a chromatic target color in the first coefficients; and
a function of generating a third brightness signal in which a brightness of the chromatic target color is controlled based on the generated first brightness signal and second brightness signal.

* * * * *